(12) United States Patent  
Aoki

(10) Patent No.: US 10,436,292 B2  
(45) Date of Patent: Oct. 8, 2019

(54) BELT MOUNTING TOOL

(71) Applicant: Mitsuboshi Belting ltd., Kobe-shi, Hyogo (JP)

(72) Inventor: Yasuhito Aoki, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 123 days.

(21) Appl. No.: 15/546,849

(22) PCT Filed: Jan. 29, 2016

(86) PCT No.: PCT/JP2016/052745  
§ 371 (c)(1),  
(2) Date: Jul. 27, 2017

(87) PCT Pub. No.: WO2016/121960  
PCT Pub. Date: Aug. 4, 2016

(65) Prior Publication Data  
US 2017/0356530 A1 Dec. 14, 2017

(30) Foreign Application Priority Data

Jan. 29, 2015 (JP) ................................. 2015-015147  
Jan. 13, 2016 (JP) ................................. 2016-004098

(51) Int. Cl.  
*F16H 7/24* (2006.01)  
*F16H 7/02* (2006.01)

(52) U.S. Cl.  
CPC ................. *F16H 7/24* (2013.01); *F16H 7/02* (2013.01)

(58) Field of Classification Search  
CPC ..................................... F16H 7/24; F16H 7/22  
(Continued)

(56) References Cited

U.S. PATENT DOCUMENTS 4,109,544 A * 8/1978 Clark ........................ F16H 7/24  
474/130  
9,739,350 B2 * 8/2017 Maruyama ................ F16H 7/24  
(Continued)

FOREIGN PATENT DOCUMENTS

CN 101852279 A 10/2010  
DE 112012003960 T5 7/2014  
(Continued)

OTHER PUBLICATIONS

Dec. 4, 2018—(CN) Notification of First Office Action—App 201680007529.3  
(Continued)

*Primary Examiner* — William E Dondero  
*Assistant Examiner* — Mark K Buse  
(74) *Attorney, Agent, or Firm* — Banner & Witcoff, Ltd.

(57) ABSTRACT

A belt installation tool (406) of the present invention includes a pulley pressing part (407) capable of being pressed toward a side of an outer periphery of a crank pulley (2) by the tension of a V-ribbed belt (4), a protection layer (471) having elasticity and covering the pulley pressing part (407) on the side of the outer periphery of the crank pulley (2), a belt hold part (408) for hooking and holding the V-ribbed belt 4, and a belt pressing part (409) for pressing the V-ribbed belt (4) extending along the outer periphery of the crank pulley (2) against the outer periphery of the crank pulley (2).

5 Claims, 24 Drawing Sheets

(58) Field of Classification Search
USPC .................................. 474/148, 144, 130
See application file for complete search history.

(56) References Cited

U.S. PATENT DOCUMENTS

| | | | | |
|---|---|---|---|---|
| 2003/0176248 A1* | 9/2003 | De Meester | ............. | F16H 7/24 474/130 |
| 2004/0248681 A1* | 12/2004 | Riaudel | ................. | F16H 7/24 474/130 |
| 2005/0164815 A1* | 7/2005 | Winninger | ............... | F16G 5/20 474/130 |
| 2005/0170923 A1* | 8/2005 | Hodjat | .................... | F16H 7/24 474/130 |
| 2005/0221934 A1* | 10/2005 | Shaw | ...................... | F16H 7/24 474/130 |
| 2006/0009322 A1* | 1/2006 | Fletcher | .................. | F16H 7/24 474/130 |
| 2010/0125995 A1* | 5/2010 | Fukatani | ................. | F16H 7/24 29/270 |
| 2010/0248878 A1* | 9/2010 | Maruyama | ............... | F16H 7/24 474/148 |
| 2012/0040791 A1* | 2/2012 | Mitchell | .................. | F16H 7/24 474/119 |
| 2012/0180608 A1* | 7/2012 | Gibson | ............ | B29C 45/14549 81/489 |
| 2013/0081241 A1* | 4/2013 | Kunisada | ................. | F16H 7/24 29/235 |
| 2014/0018200 A1* | 1/2014 | Kunisada | ................. | F16H 7/24 474/130 |
| 2014/0274509 A1* | 9/2014 | Kunisada | ................. | F16H 7/24 474/101 |
| 2017/0224072 A1* | 8/2017 | Van Varick | .............. | A45B 9/02 |
| 2017/0356530 A1* | 12/2017 | Aoki | ........................ | F16H 7/02 |

FOREIGN PATENT DOCUMENTS

| | | |
|---|---|---|
| JP | 2006-300172 A | 11/2006 |
| JP | 2007-120678 A | 5/2007 |
| JP | 5271930 B2 | 8/2013 |
| WO | 200512766 A1 | 2/2005 |

OTHER PUBLICATIONS

Oct. 24, 2018—(EP) Extended Search Report—App 16743563.5.
Mar. 29, 2016—International Search Report—Intl App PCT/JP2016/052745.

\* cited by examiner

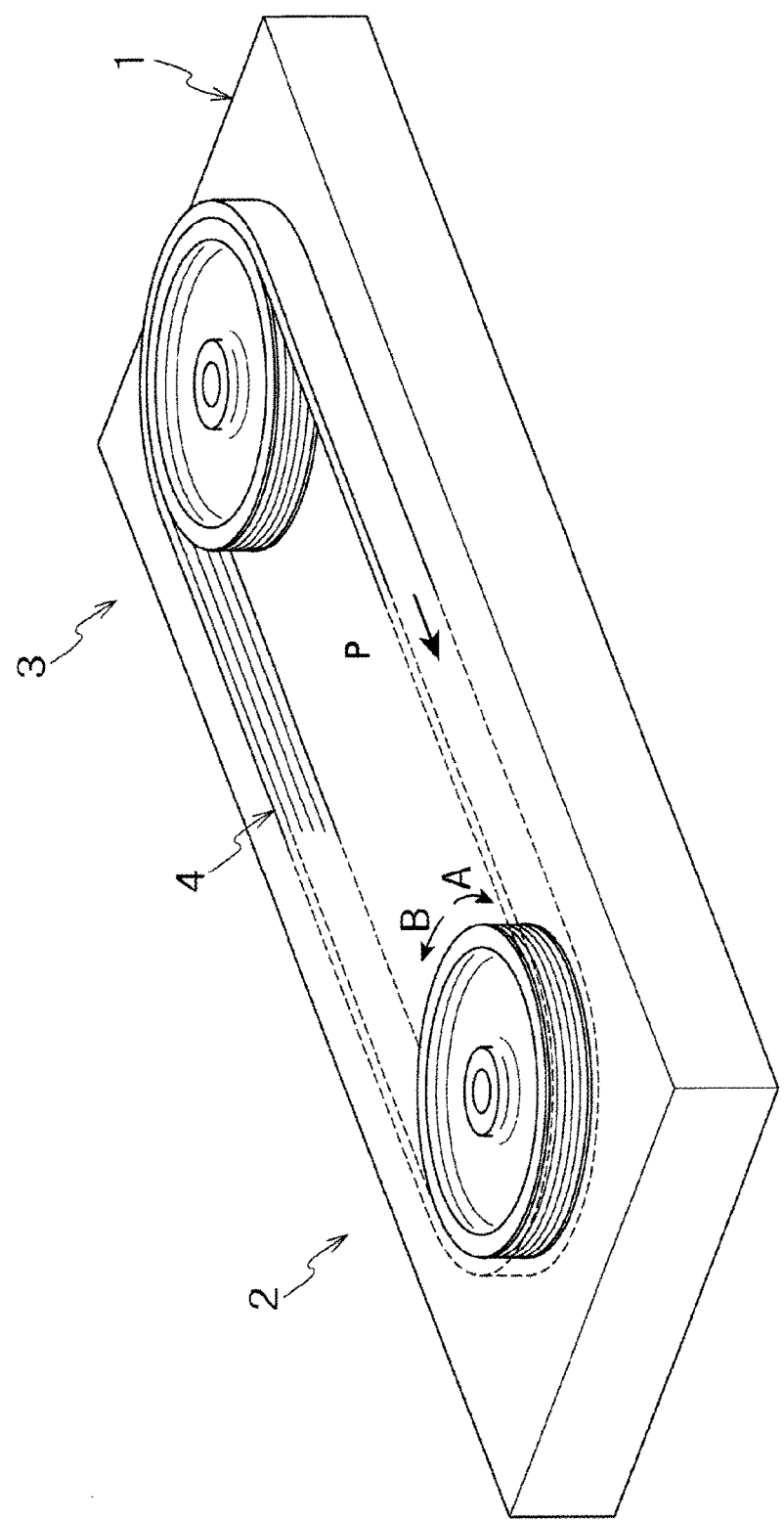

[FIG. 2]
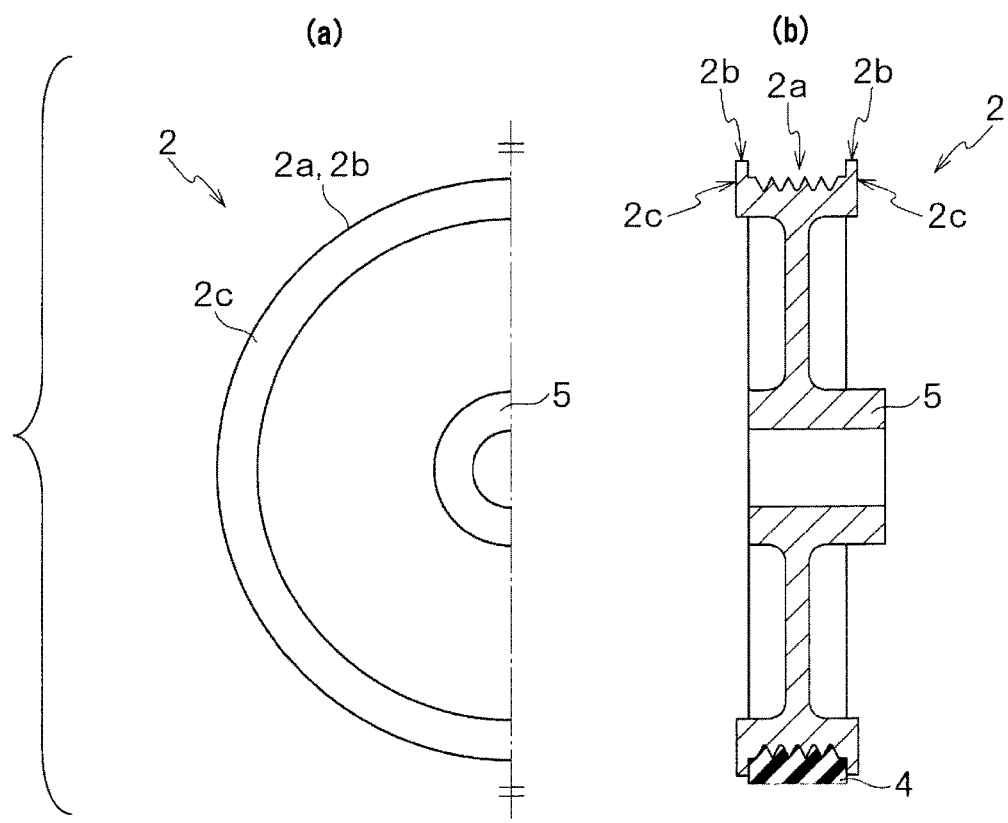

[FIG. 3]
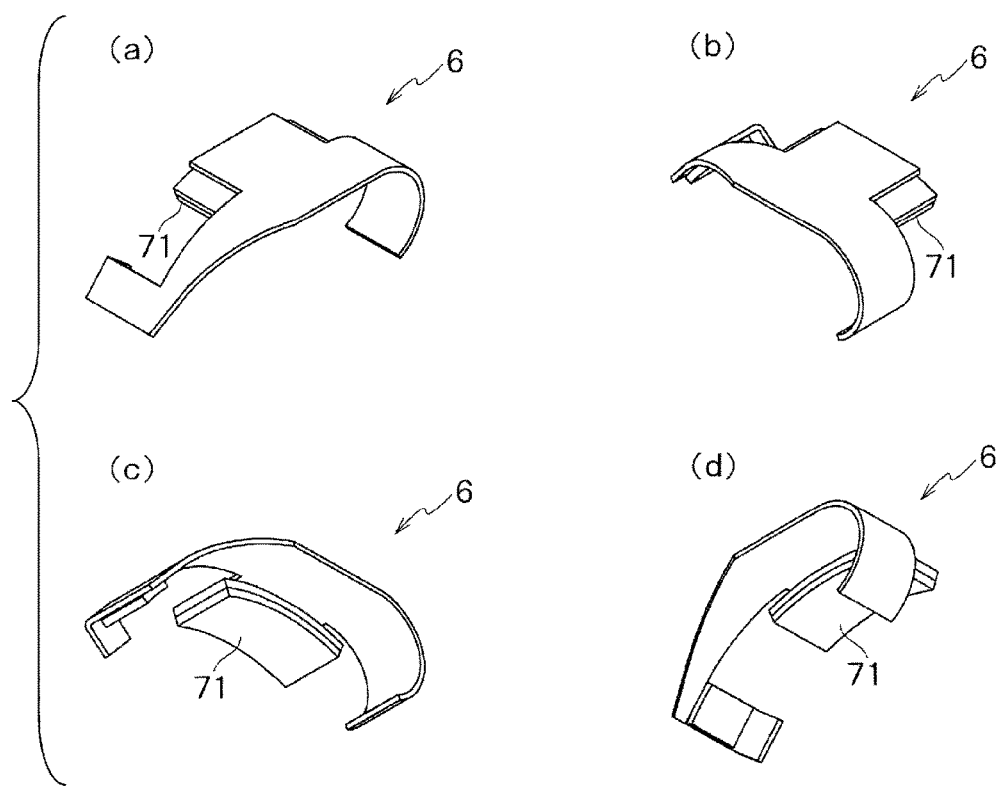

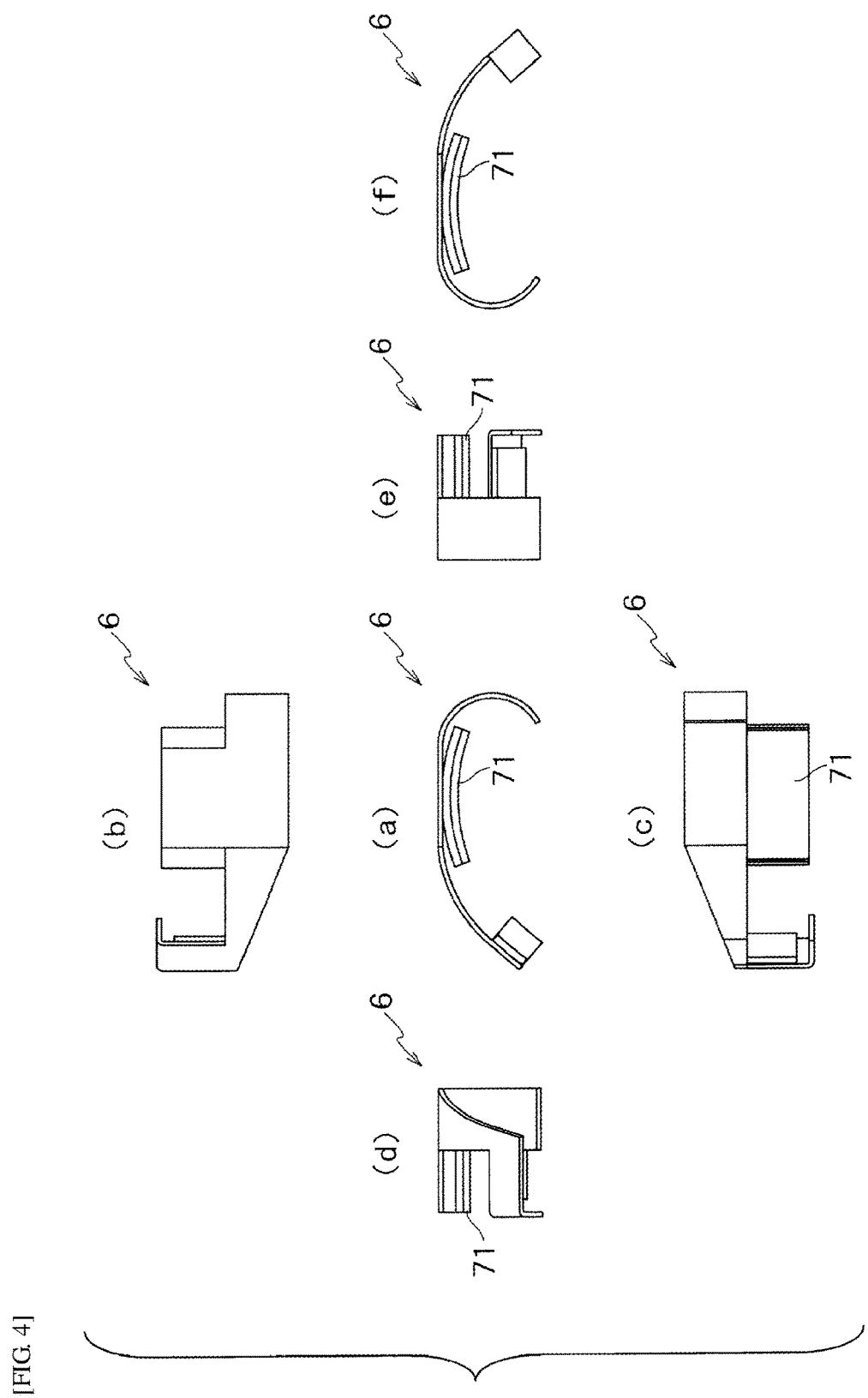

[FIG. 5]
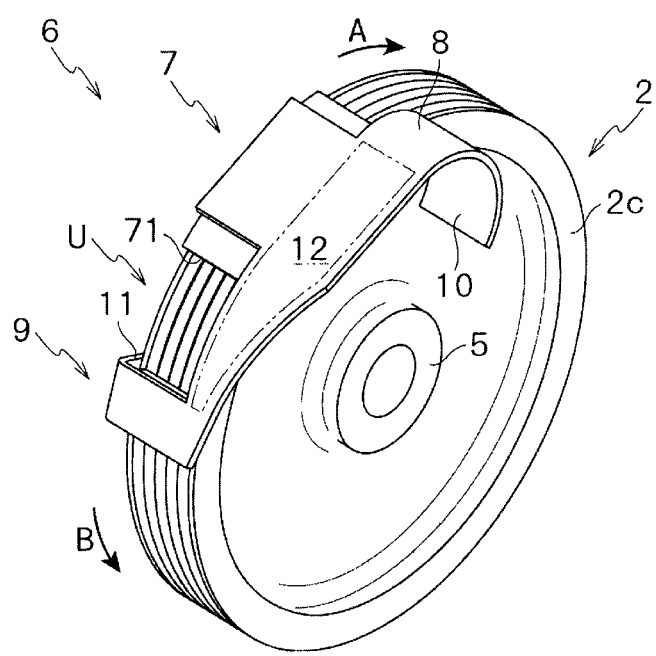

[FIG. 6]
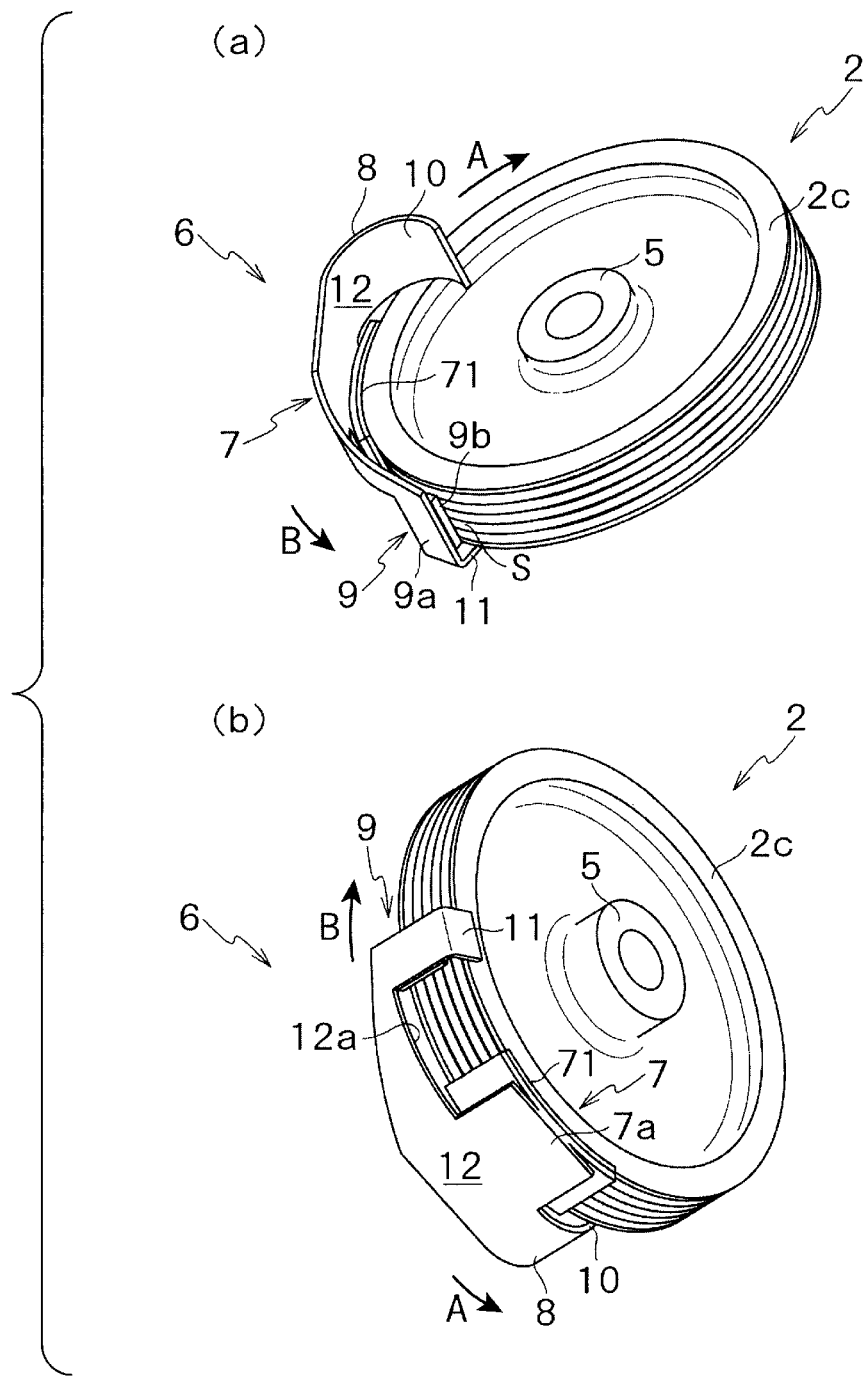

[FIG. 7]
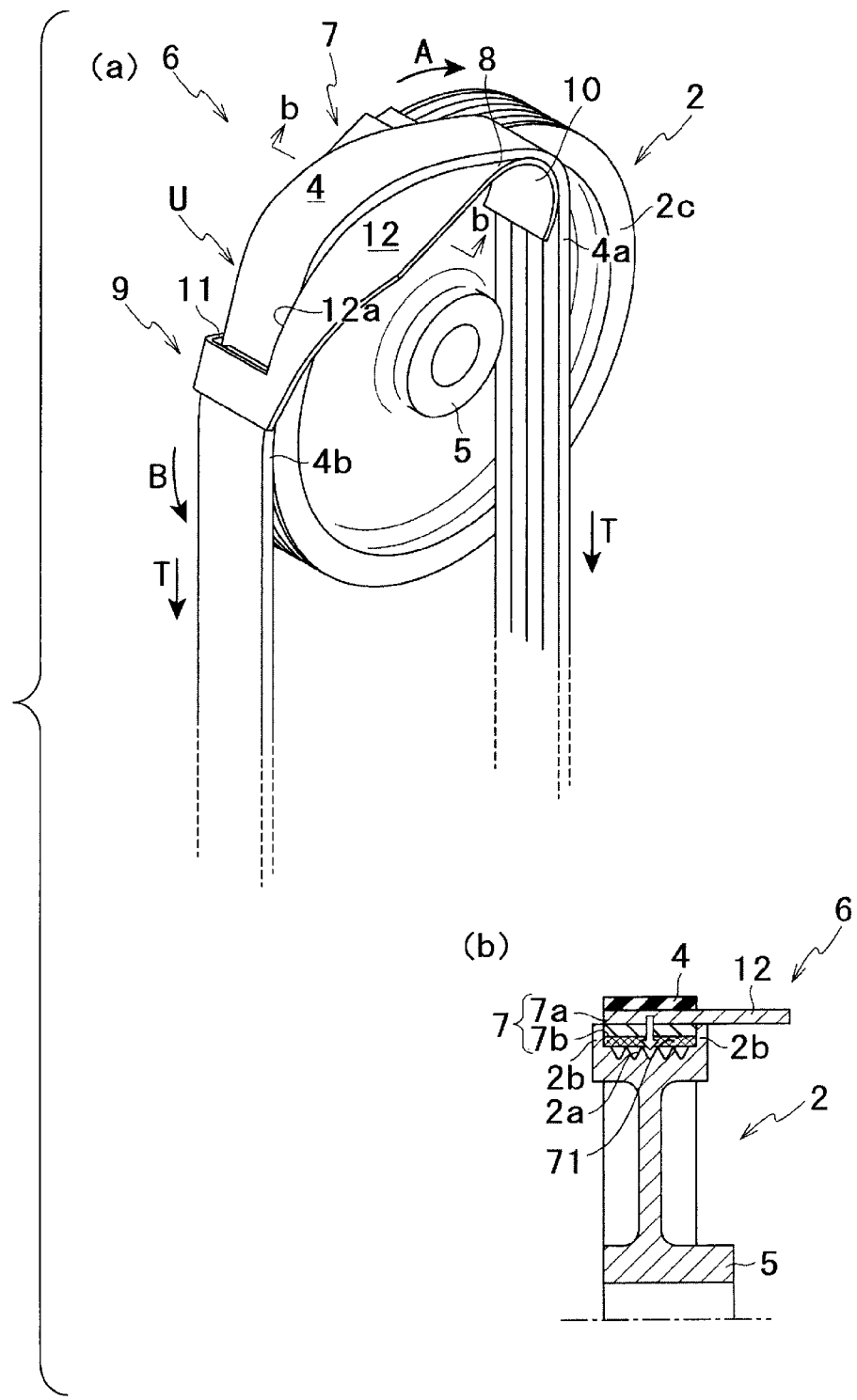

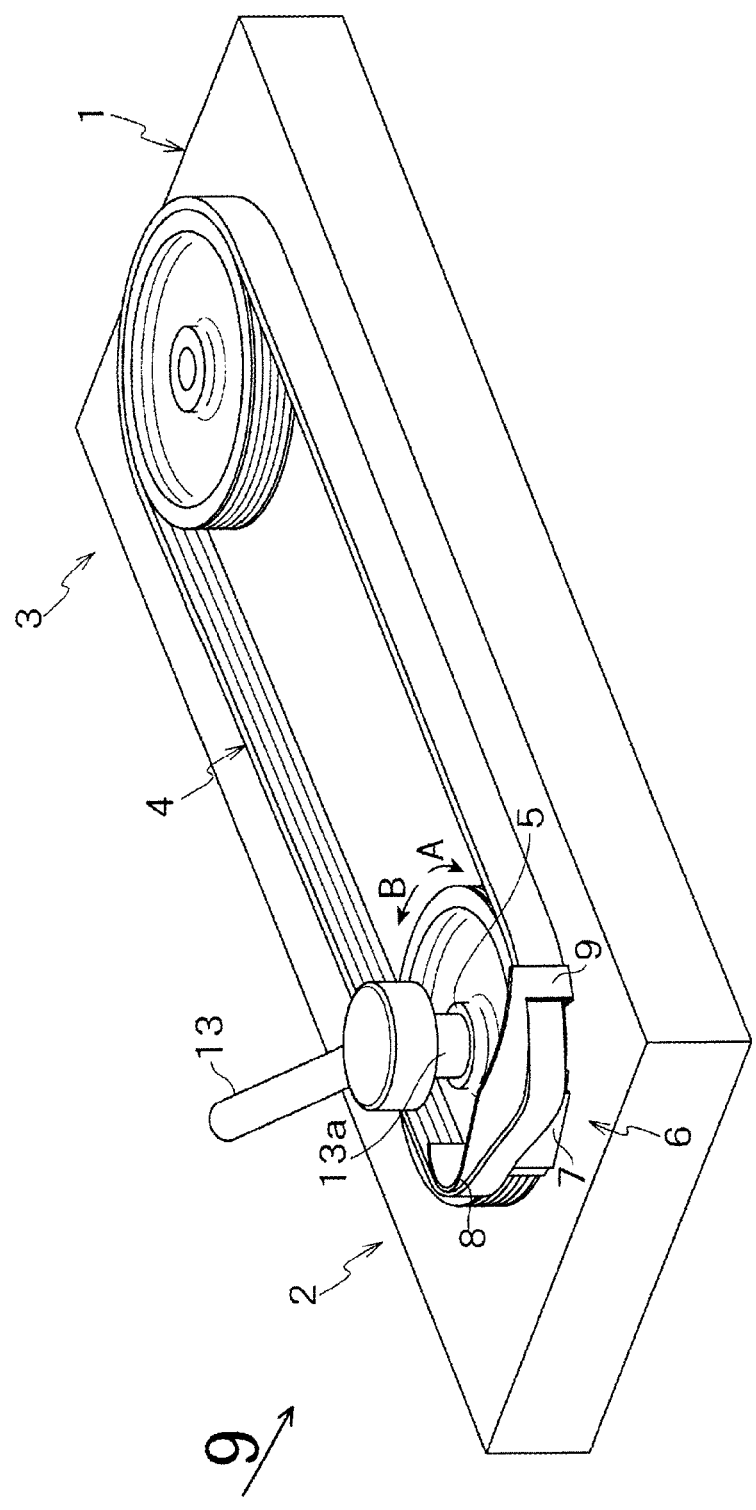
[FIG. 8]

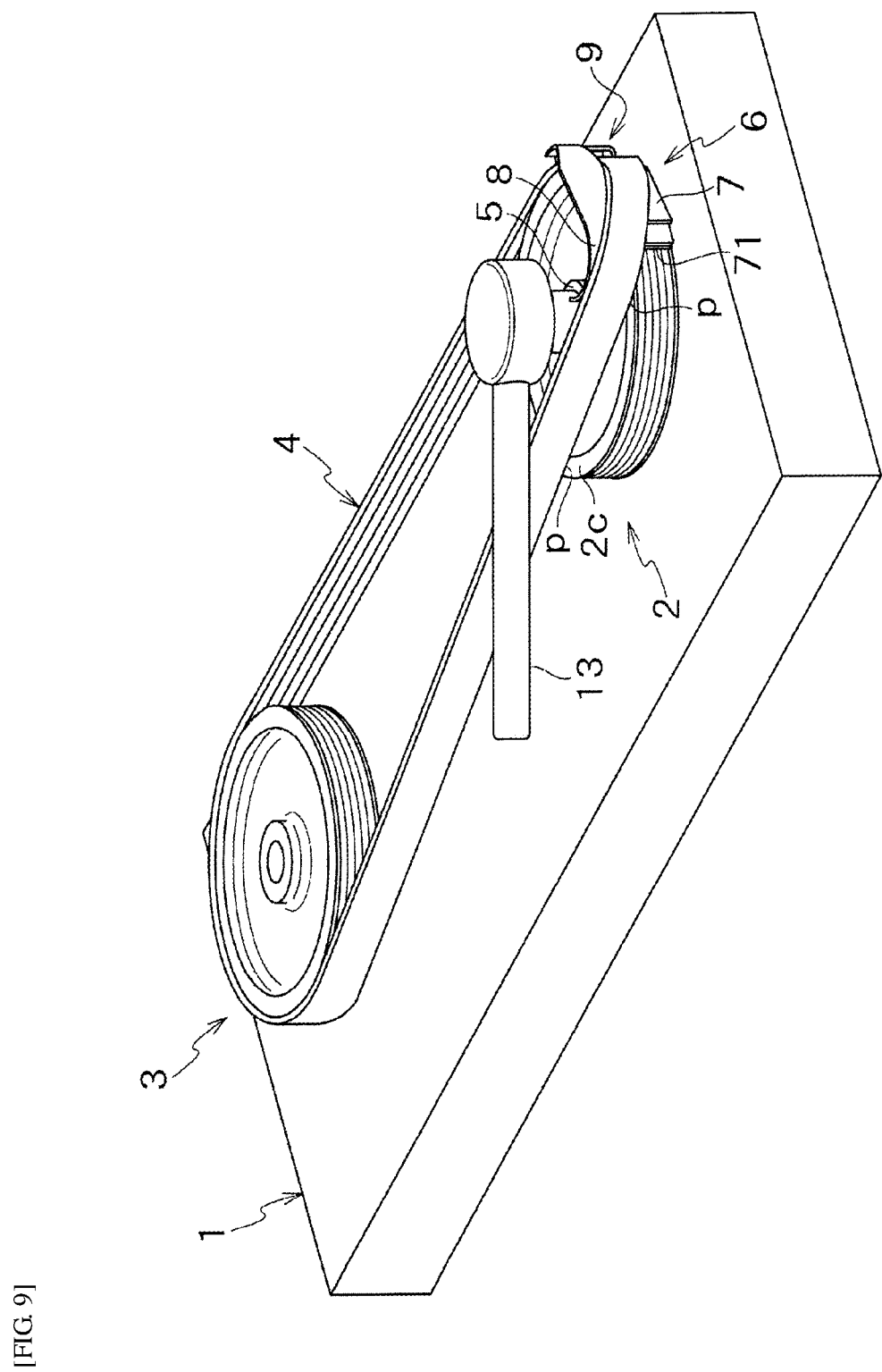
[FIG. 9]

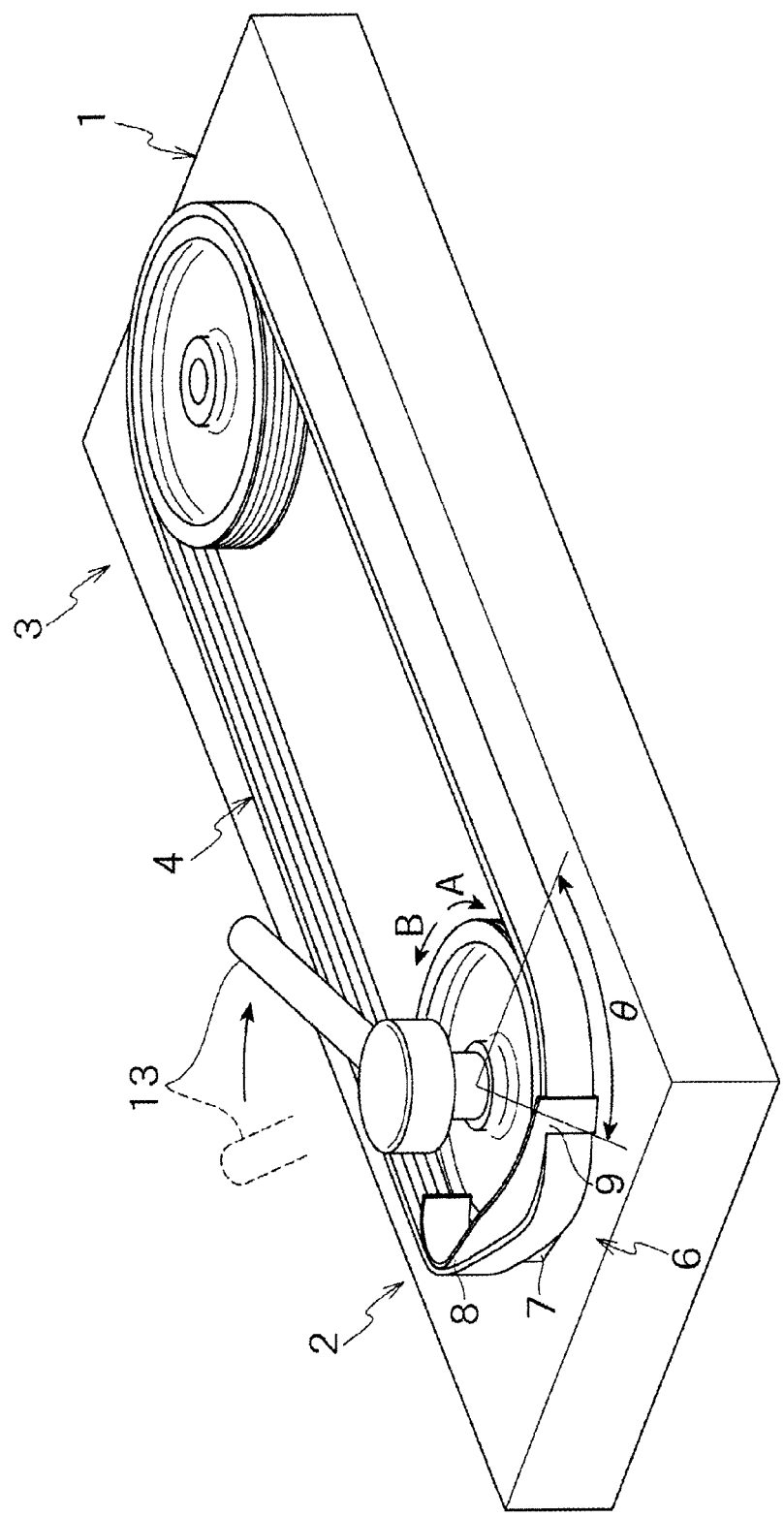
[FIG. 10]

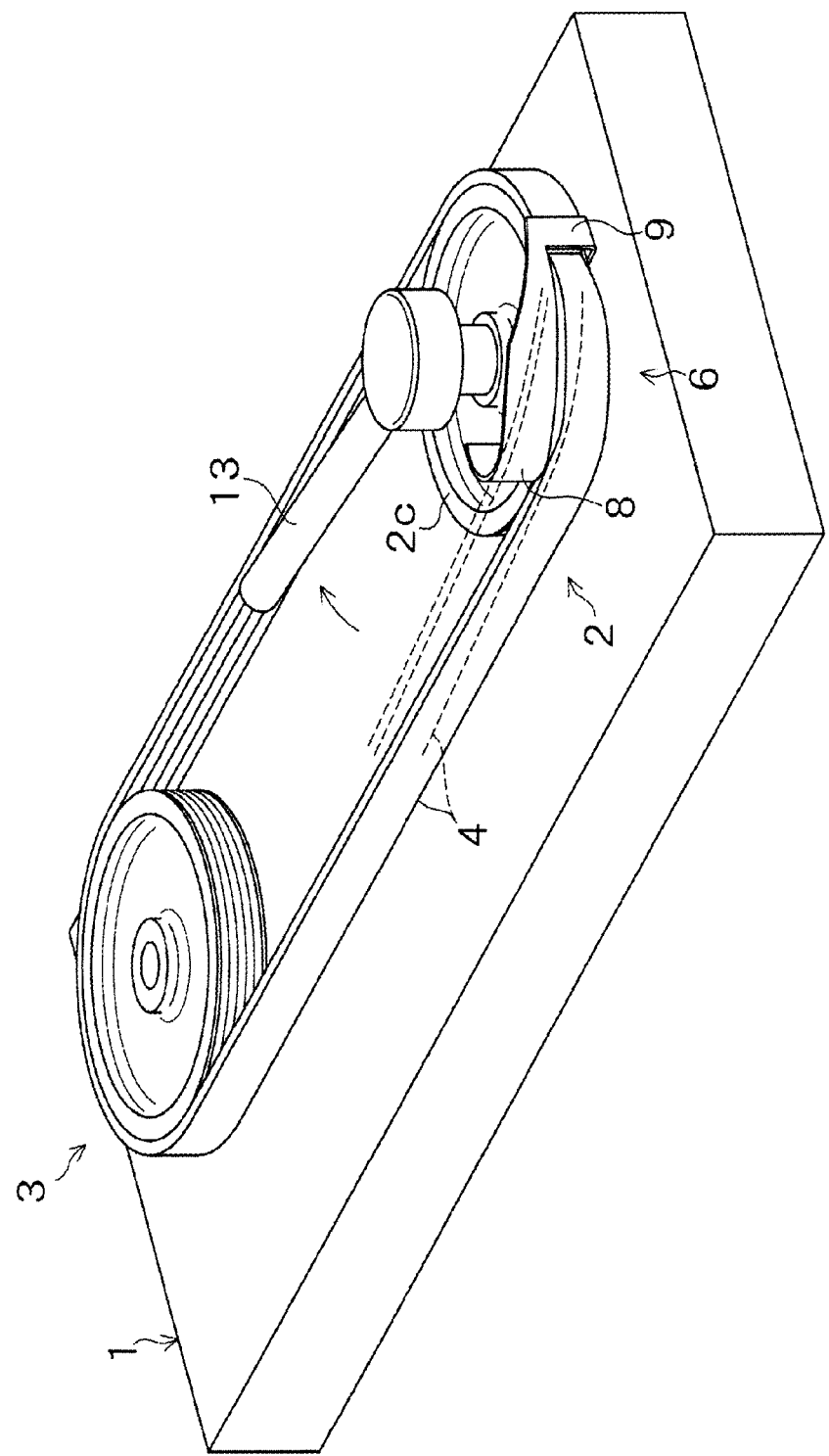
[FIG. 11]

[FIG. 12]
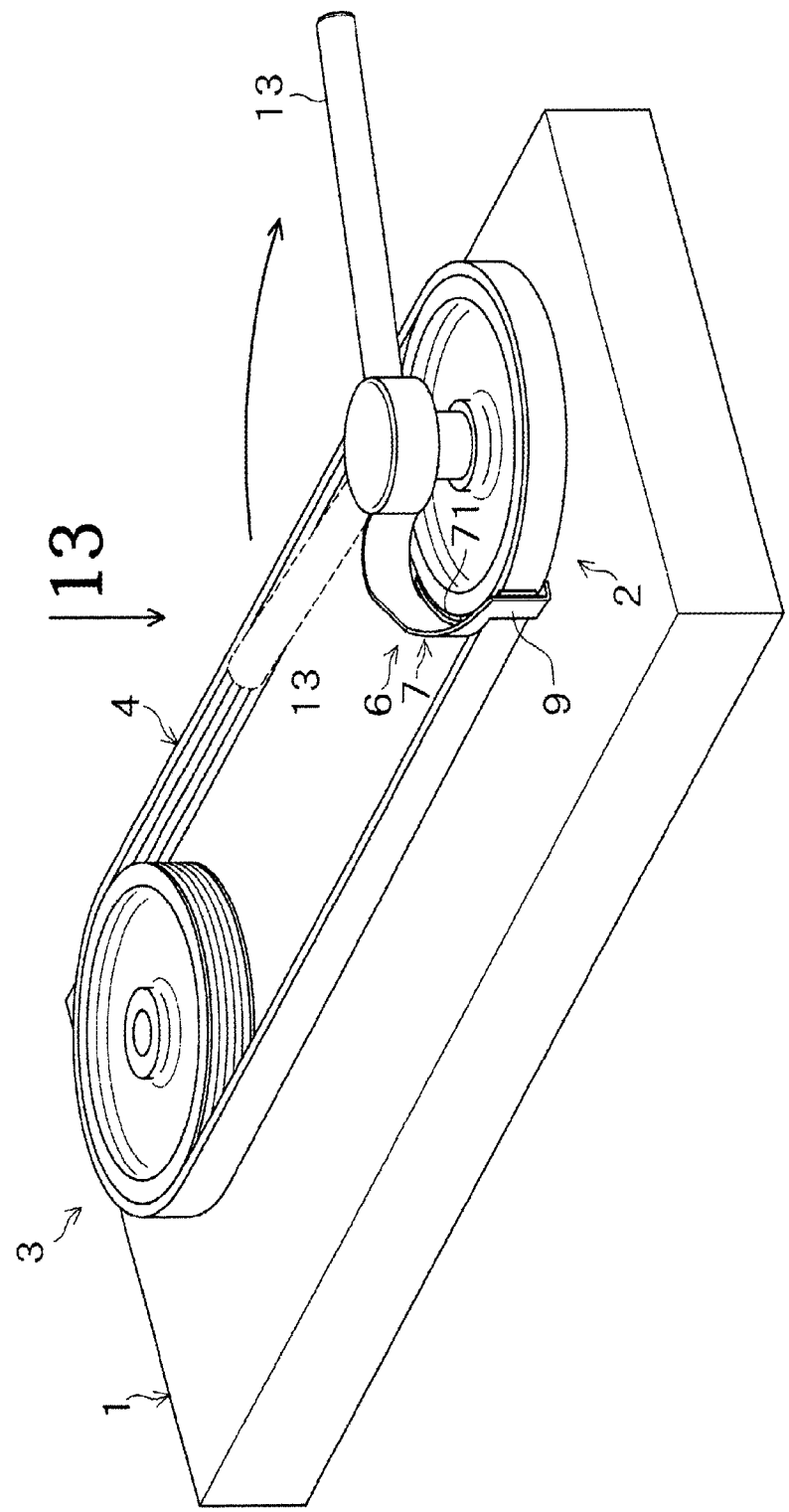

[FIG. 13]
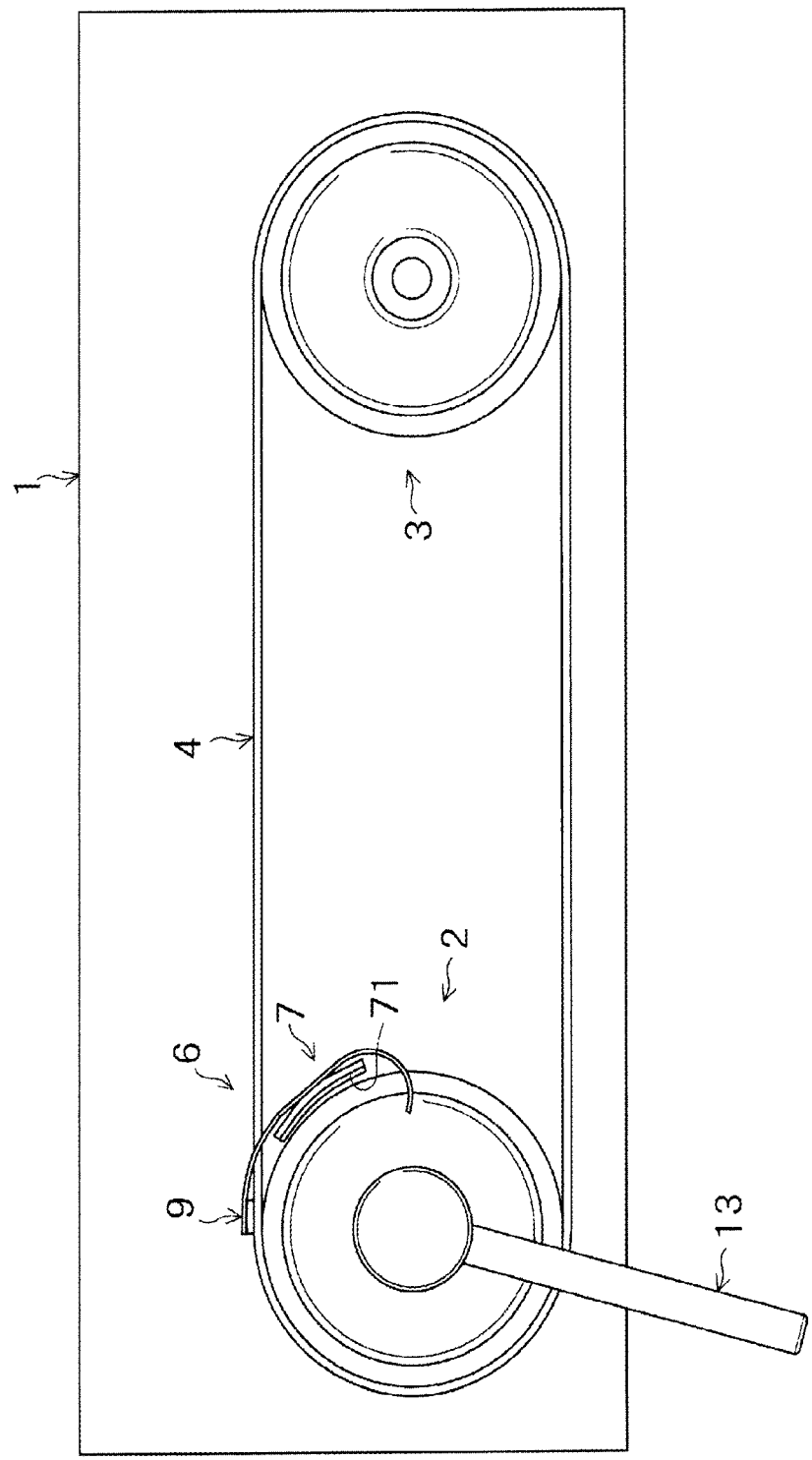

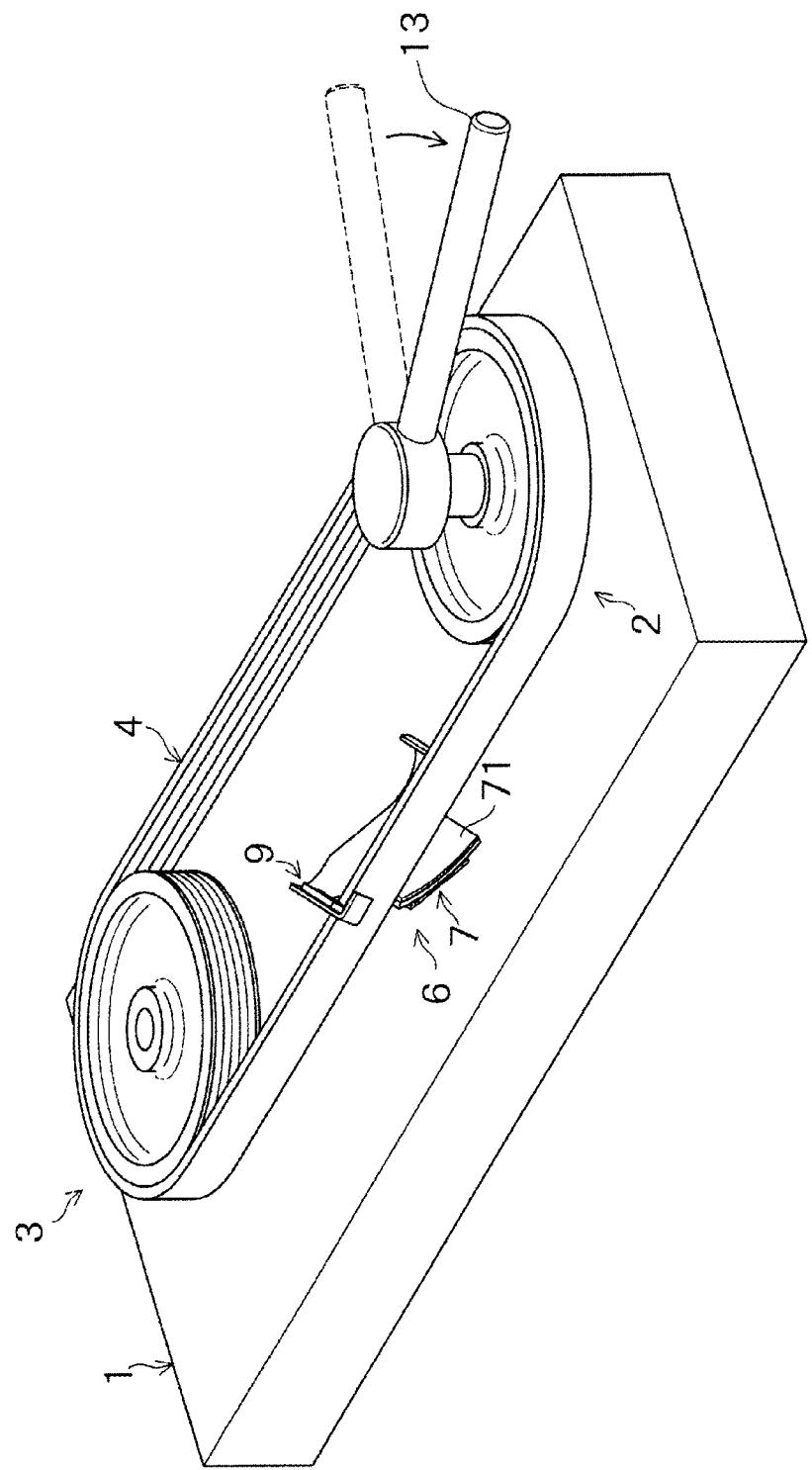
[FIG. 14]

[FIG. 15]
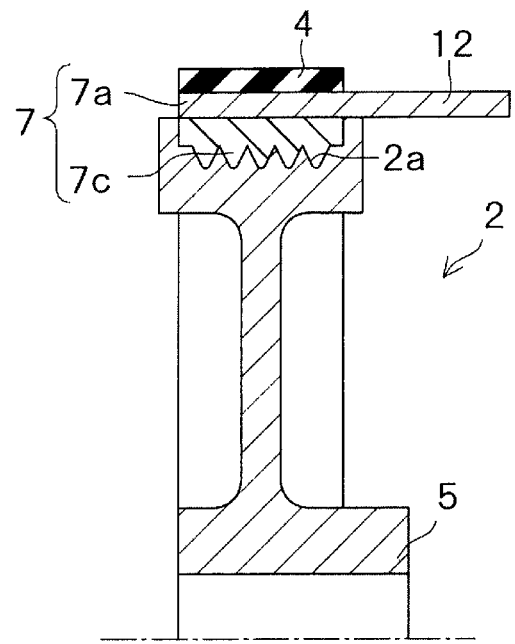
[FIG. 16A]
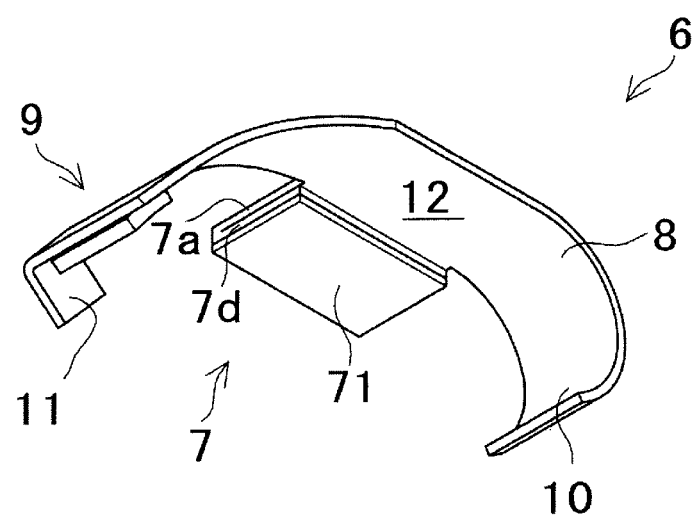

[FIG. 16B]
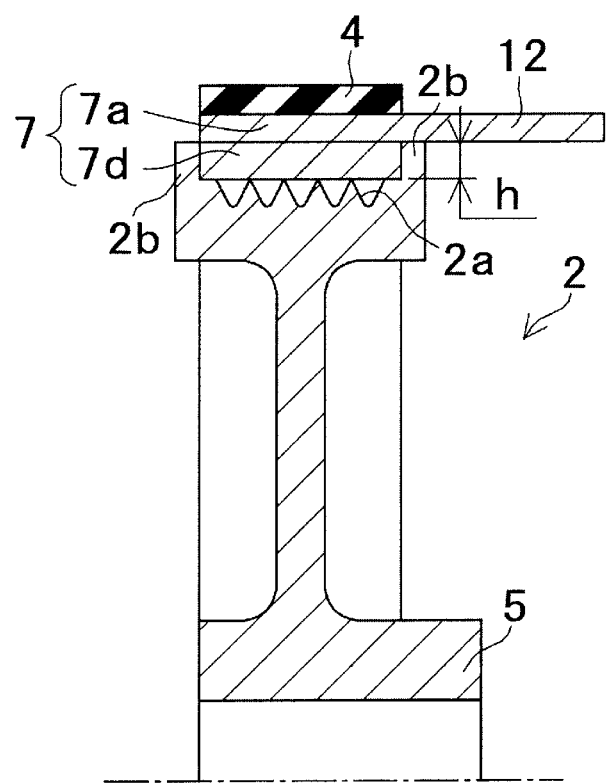

[FIG. 17]
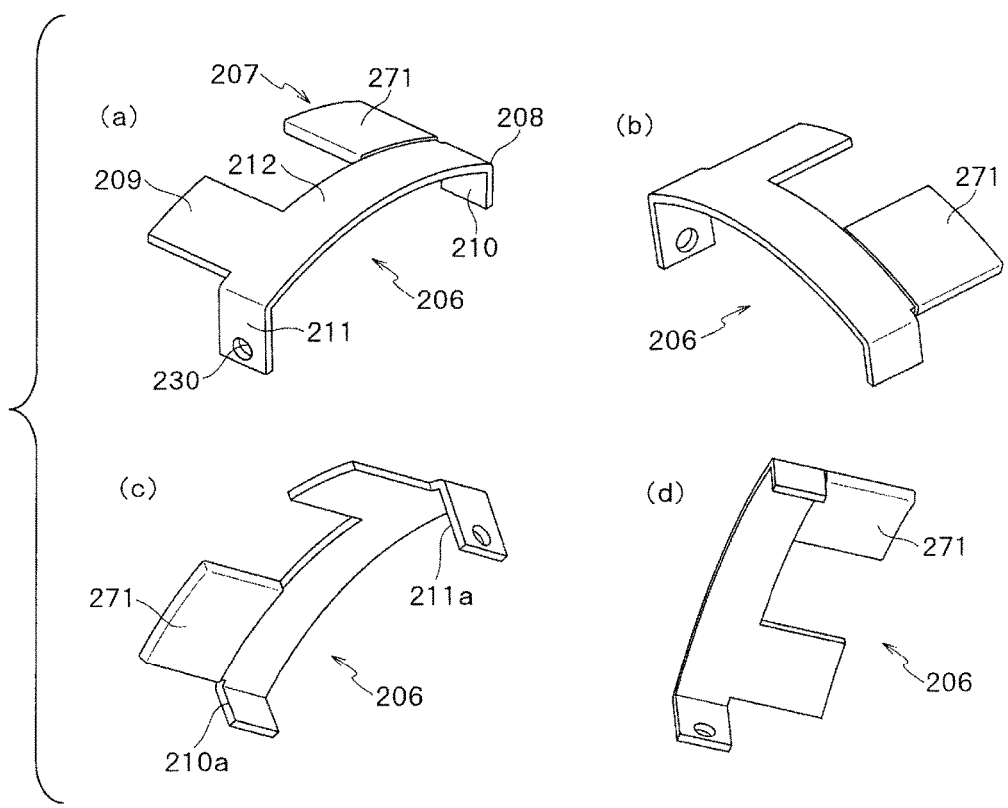

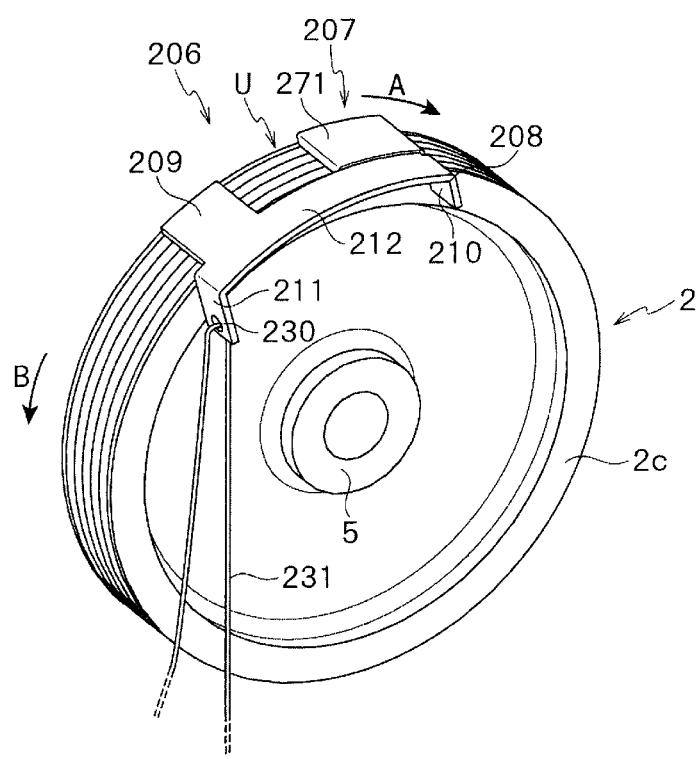
[FIG. 18]

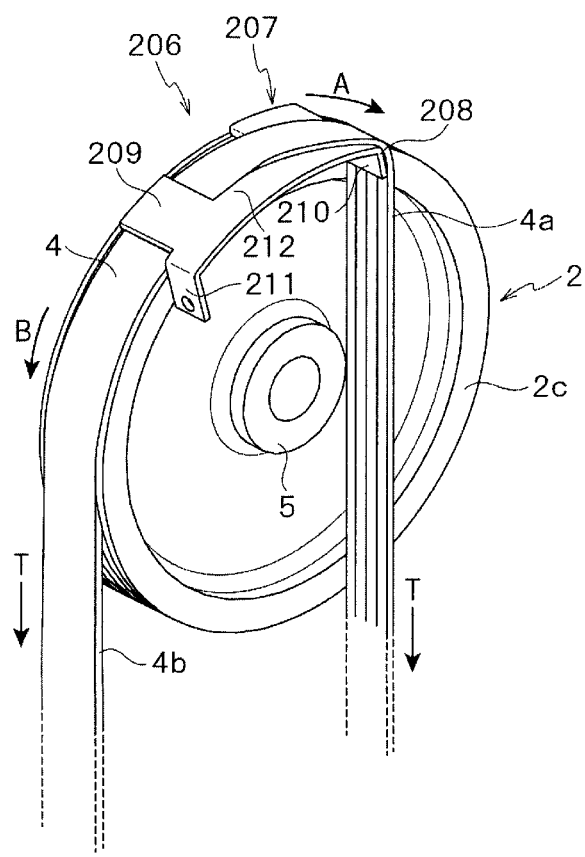
[FIG. 19]

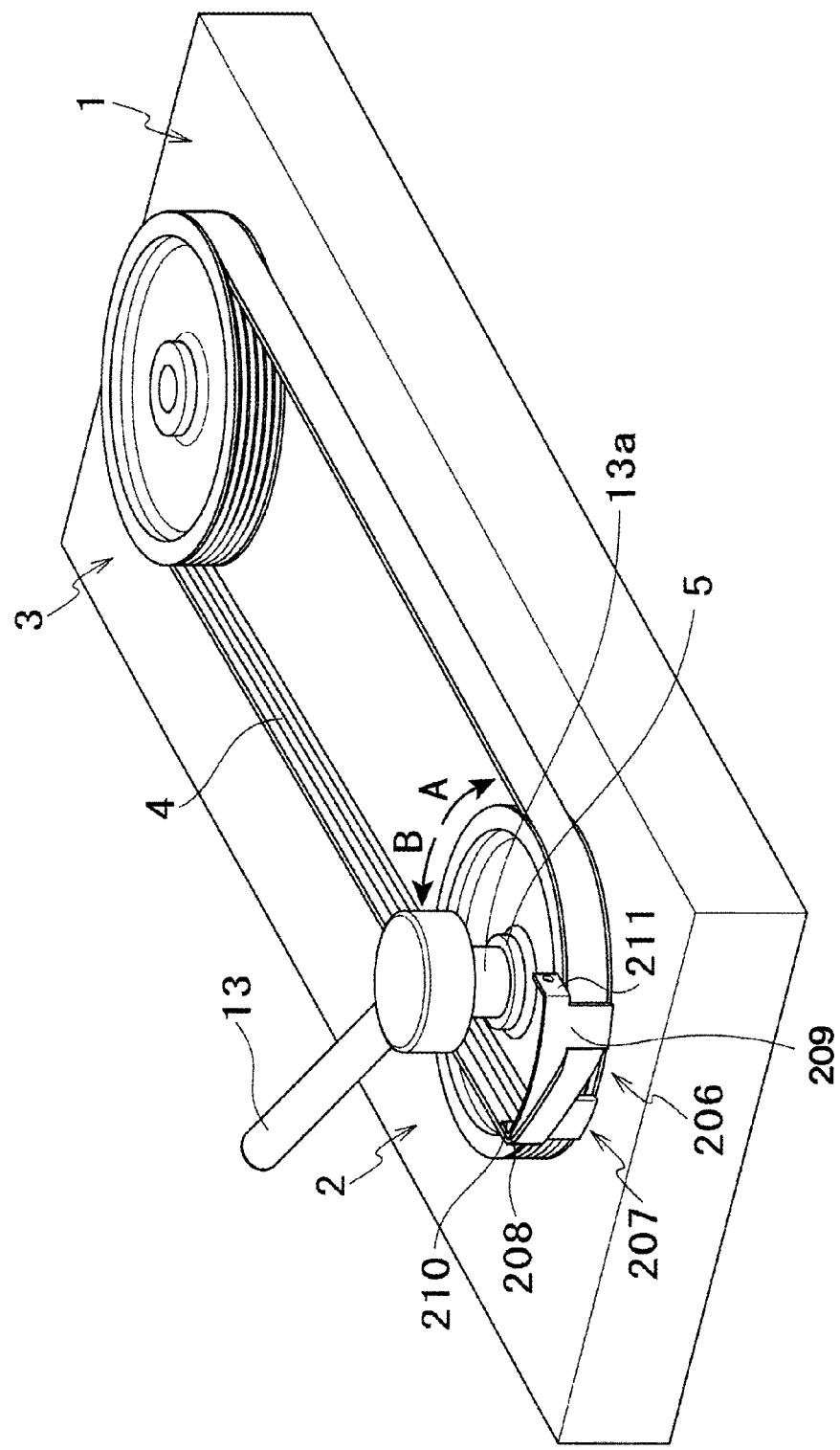
[FIG. 20]

[FIG. 21]
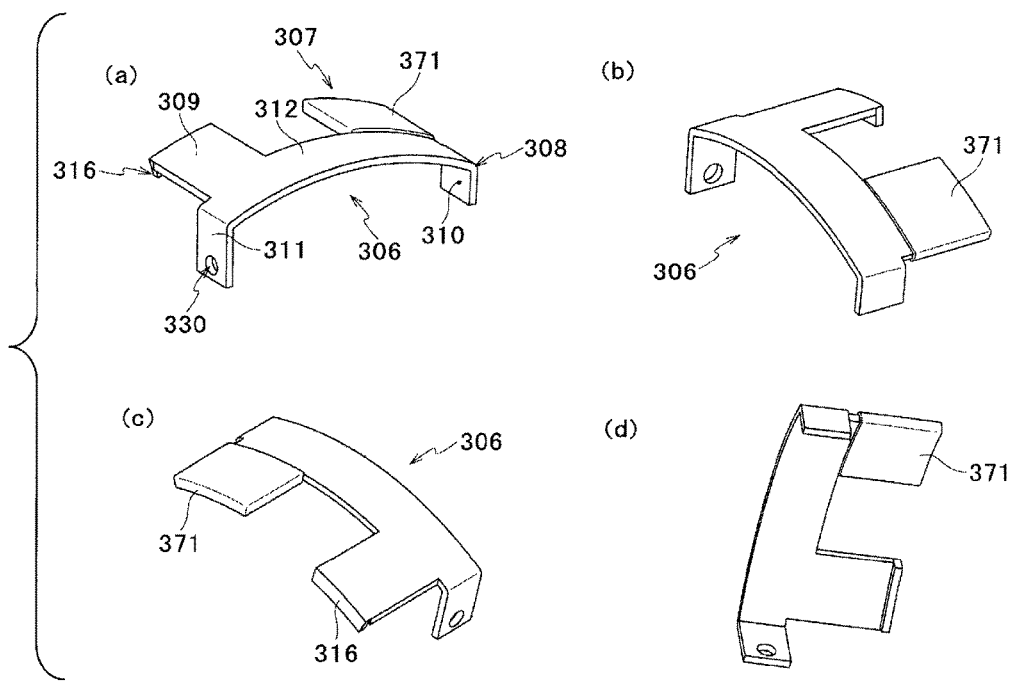
[FIG. 22]
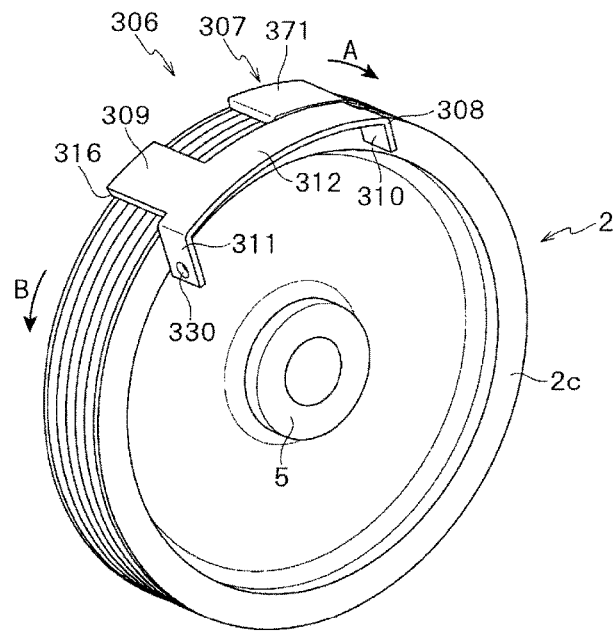

[FIG. 23]
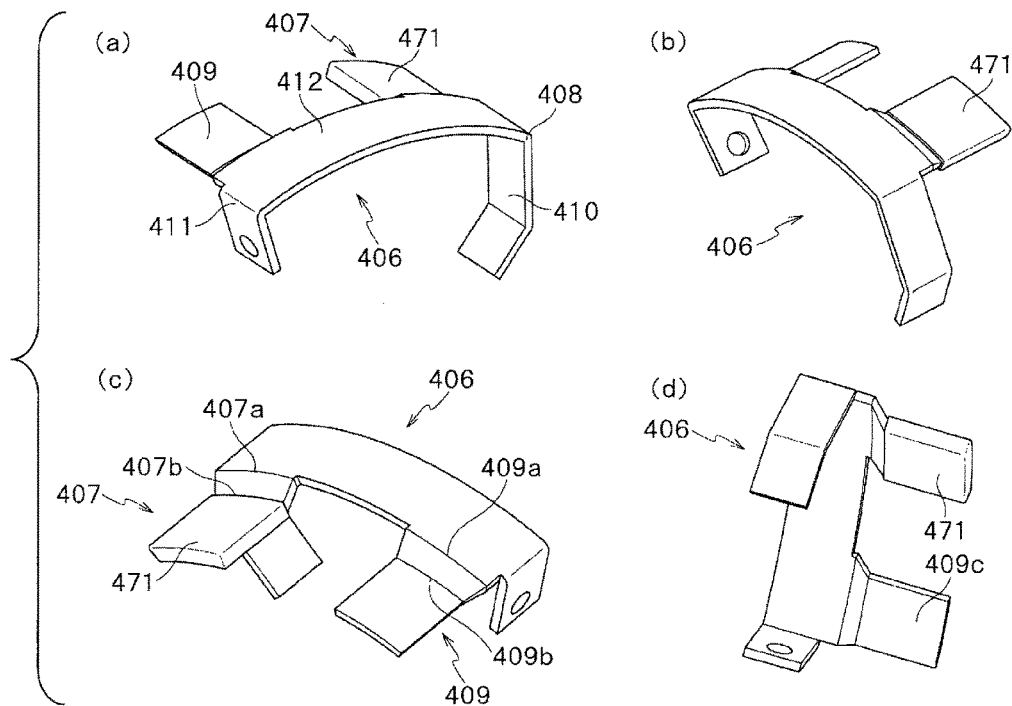
[FIG. 24]
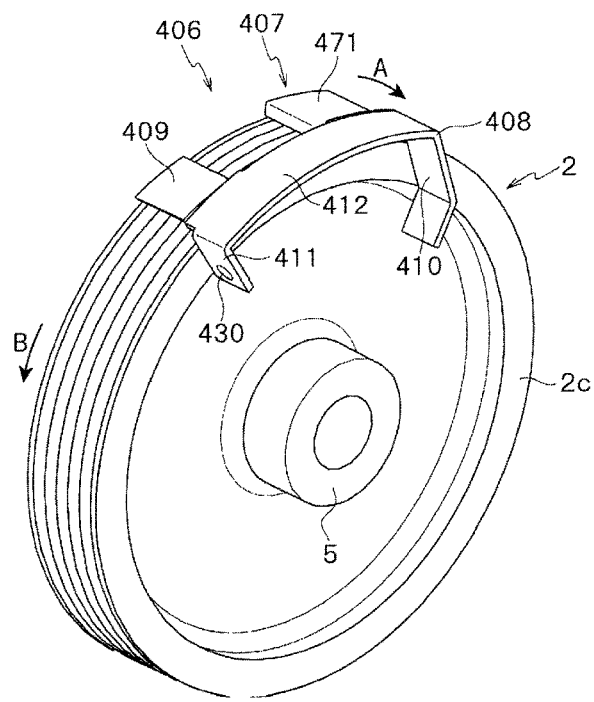

[FIG. 25]
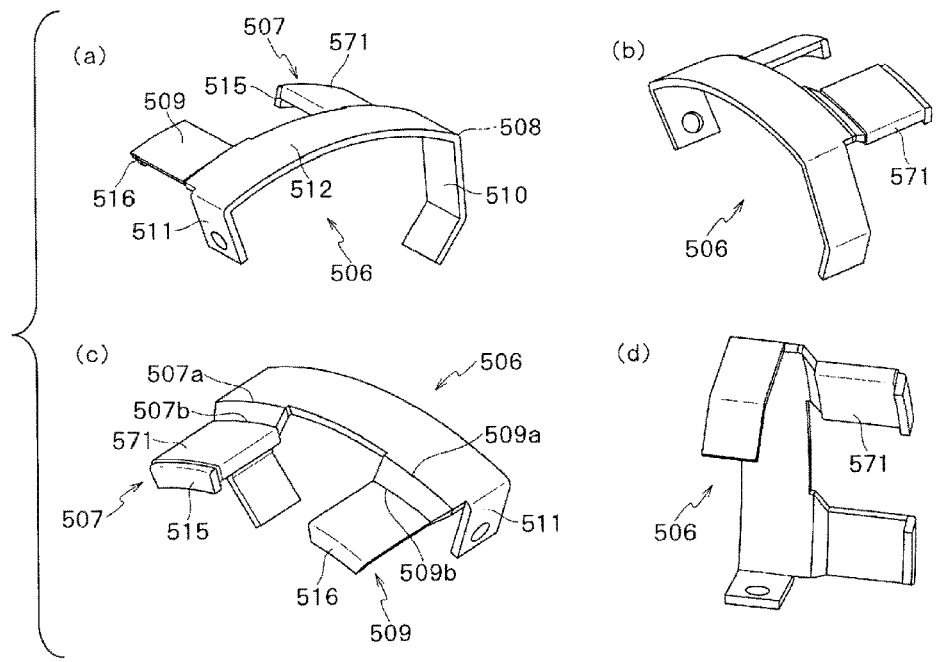
[FIG. 26]
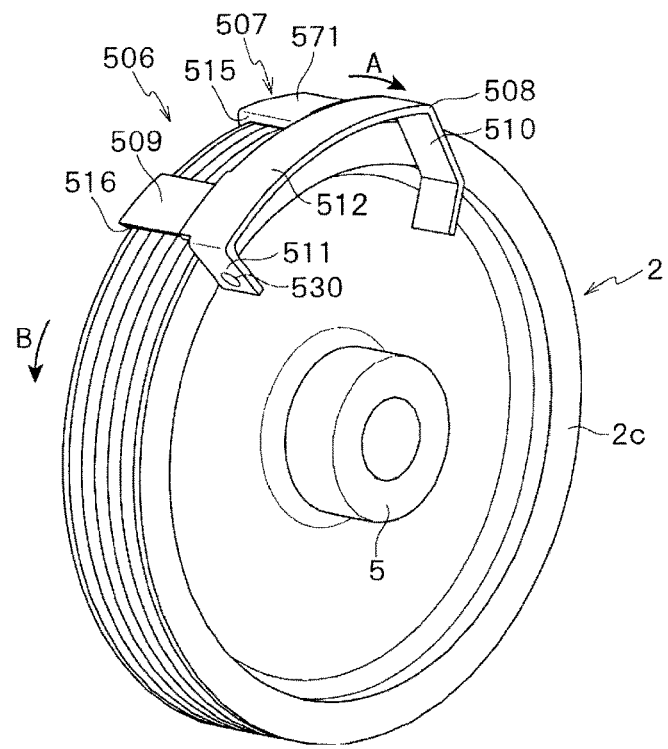

[FIG. 27]
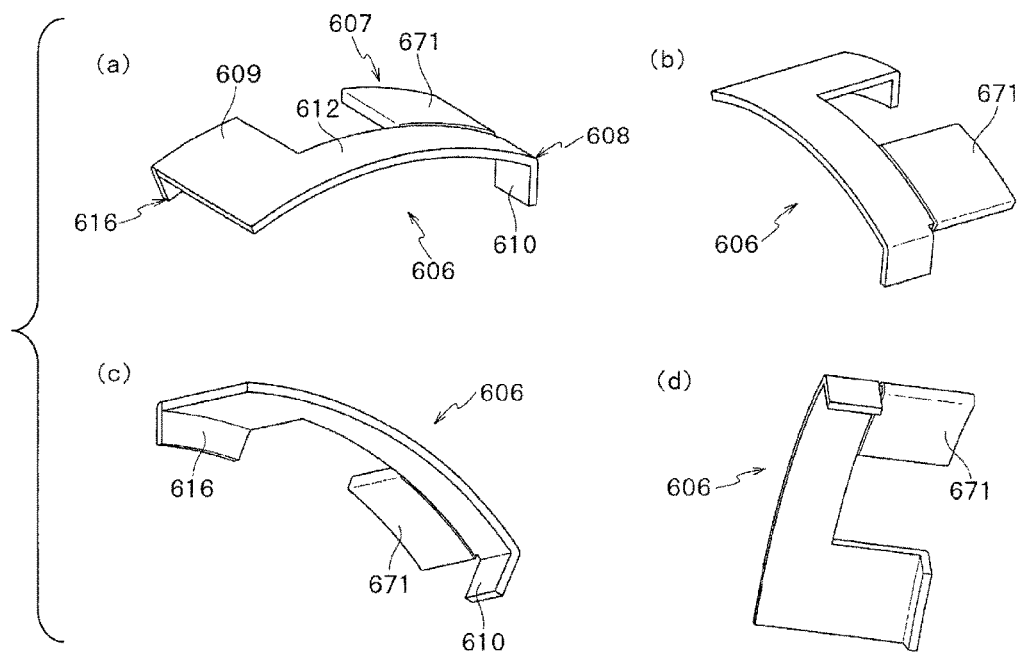
[FIG. 28]
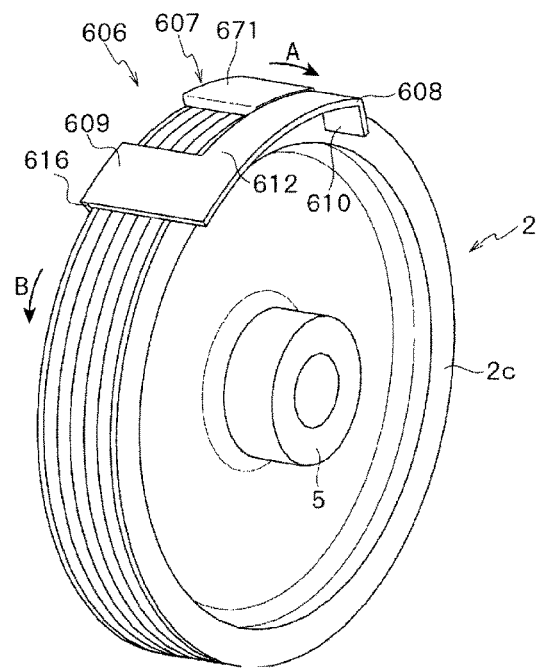

BELT MOUNTING TOOL

CROSS REFERENCE TO RELATED APPLICATIONS:

This is a U.S. National Phase Application under 35 U.S.C. § 371 of International Application No. PCT/JP2016/052745, filed Jan. 29, 2016, which claims priority to Japanese Application No. 2015-015147, filed Jan. 29, 2015, and Japanese Application No. 2016-004098, filed Jan. 13. 2016, and which was published Under PCT Article 21(2), the entire contents of which are incorporated herein by reference.

TECHNICAL FIELD

The present invention relates to a belt installation tool to be used when winding a belt between multiple pulleys.

BACKGROUND ART

Generally, in a belt power transmission mechanism with a belt wound on multiple pulleys, in order to transmit power between the pulleys reliably, the peripheral length of the belt is set shorter than a layout peripheral length between the pulleys on which the belt is to be wound, whereby strong tension can be applied to the belt.

However, it may take time and labor to wind such a belt having the belt peripheral length shorter than the layout peripheral length between the pulleys on the pulleys. To reduce the time and labor, in the patent document 1, there is disclosed a tool for assisting the operation to extend a belt in the peripheral direction and wind it on the outer peripheries of pulleys.

For example, the belt installation tool disclosed in the patent document 1 has a structure including a pulley pressing part to be pressed against the outer periphery of a first pulley by the tension of a belt wound thereon, a belt hold part for hooking and holding the belt, and a belt pressing part for pressing the belt wound along the outer periphery of the first pulley against the outer periphery of the first pulley. Use of this belt installation tool can facilitate the operation to extend the belt in the peripheral direction and wind it onto the outer periphery of the first pulley.

PRIOR ART DOCUMENT

Patent Document

Patent Document 1: JP Patent No. 5271930

SUMMARY OF THE INVENTION

Problems that the Invention is to Solve

However, when using the above belt installation tool, the pulley pressing part is pressed against the outer periphery of the first pulley by the tension of the belt (see FIG. 7). As a result, in some cases, the pulley pressing part and the outer periphery of the first pulley are excessively contacted with each other to thereby peel off painting on the outer peripheral surface of the first pulley or further cause damages on the pulley pressing part and the outer peripheral surface of the first pulley.

Thus, the present invention aims at solving the above problem and its object is to form a belt installation tool having a compact structure and provide a belt installation tool capable of preventing damage to a pulley.

Means for Solving the Problems

The belt installation tool according to the present invention for solving the above problems is a belt installation tool to be installed on the outer periphery of a first pulley for use in winding a belt stretchable in the peripheral direction between the first pulley and a second pulley with the inter-axial distance between the first pulley and the second pulley remaining fixed. The belt installation tool includes:

a pulley pressing part arranged on the outer periphery of the first pulley and, when the belt is wound thereon, capable of being pressed toward the outer periphery of the first pulley by the tension of the belt;

a protection layer having elasticity and arranged on the pulley pressing part on a side of the outer periphery of the first pulley so as to come into contact with the outer periphery of the first pulley when the belt installation tool is installed on the outer periphery of the first pulley;

a belt hold part for hooking and holding a part deviated from the outer periphery of the first pulley, of the belt wound on the pulley pressing part; and a belt pressing part arranged opposed to the outer periphery of the first pulley for pressing a part extending along the outer periphery of the first pulley, of the belt wound on the pulley pressing part, against the outer periphery of the first pulley.

According to this structure, the pulley pressing part exhibits a function of strongly fixing the belt installation tool against outer periphery of the first pulley by using the high tension of the belt. Since the belt is surely situated outside of the pulley pressing part in the pulley radial direction with no problem due to the existence of the belt hold part and belt pressing part, the belt hold part and belt pressing part play a role of stably exhibiting a function of strongly fixing the belt installation tool to the outer periphery of the first pulley.

Also, the elastic protection layer is arranged on the pulley pressing part on a side of the outer periphery of the first pulley so as to come into contact with the outer periphery of the first pulley when the belt installation tool is installed on the outer periphery of the first pulley. Thus, when the belt is wound on the pulley pressing part and the pulley pressing part is pressed toward the outer periphery of the first pulley, the elastic protection layer comes into direct contact with the outer periphery of the first pulley, thereby enabling prevention of damage to the outer periphery of the first pulley and damage to the pulley pressing part. Also, the elastic protection layer can suppress the sliding (position deviation) of the belt installation tool with respect to the first pulley.

Also, in the belt installation tool of the present invention, the protection layer may also be formed of a resin.

Since the protection layer is formed of a resin, this structure is excellent in versatility.

Also, in the belt installation tool of the present invention, the resin forming the protection layer may also be soft vinyl chloride.

Since the protection layer is formed of soft vinyl chloride, this structure is excellent in manufacturing cost and workability.

Also, in the belt installation tool of the present invention, the protection layer may have a hollow tube shape and may be fitted into the pulley pressing part.

According to this structure, the whole of the pulley pressing part can be covered by the tube-shaped protection layer. Thus, the whole of the pulley pressing part can be protected.

Also, the workability when installing the protection layer on the pulley pressing part can also be enhanced.

Also, in the belt installation tool of the present invention, the protection layer may have a thickness of 1 mm or larger and 3 mm or smaller.

In the case where the thickness of the protection layer is smaller than 1 mm, cracks may occur in the protection layer in some cases by repeated use of the belt installation tool. In the case where the thickness of the protection layer exceeds 3 mm, the thickness of the protection layer increases, whereby the workability when installing the protection layer on the pulley pressing part may be lowered in some cases.

Thus, according to the above structure, since the thickness of the protection layer is set in a range of from 1 mm to 3 mm, the strength of the protection layer can be increased without worsening the workability at the time when installing the protection layer on the pulley pressing part.

Advantageous Effect of the Invention

According to the present invention, it is possible to form a belt installation tool having a compact structure and provide a belt installation tool capable of preventing damage to a pulley.

BRIEF DESCRIPTION OF DRAWINGS

FIG. 1 is a partial perspective view of an engine main body.

FIG. 2 is a cross-sectional view of a first pulley.

FIG. 3 is a perspective view of a belt installation tool.

FIG. 4 is six views of the belt installation tool.

FIG. 5 is a view illustrating a state where the belt installation tool is installed on the outer periphery of the first pulley.

FIG. 6 is a view illustrating the state where the belt installation tool is installed on the outer periphery of the first pulley, viewed from a different angle from FIG. 5.

FIG. 7 is a view illustrating a state where the belt installation tool is installed on the outer periphery of the first pulley and a belt is set. (b) of FIG. 7 is a view of the end face taken along the b-b arrow of (a) of FIG. 7.

FIG. 8 is a first explanatory view of a method for using the belt installation tool.

FIG. 9 is a view taken along the 9 arrow of FIG. 8 and a second explanatory view of the method for using the belt installation tool.

FIG. 10 is a third explanatory view of the method for using the belt installation tool.

FIG. 11 is a fourth explanatory view of the method for using the belt installation tool.

FIG. 12 is a fifth explanatory view of the method for using the belt installation tool.

FIG. 13 is a view taken along the 13 arrow of FIG. 12 and a sixth explanatory view of the method for using the belt installation tool.

FIG. 14 is a seventh explanatory view of the method for using the belt installation tool.

FIG. 15 is a view similar to (b) of FIG. 7 and illustrates a second embodiment of the present invention.

FIG. 16A is a view of a third embodiment of the present invention.

FIG. 16B is a view similar to (b) of FIG. 7 and illustrates a third embodiment of the present invention.

FIG. 17 is a perspective view of a belt installation tool according to a fourth embodiment of the present invention.

FIG. 18 is a view illustrating a state where the belt installation tool according to the fourth embodiment of the present invention is installed on the outer periphery of the first pulley.

FIG. 19 is a view illustrating a state where the belt installation tool according to the fourth embodiment of the present invention is installed on the outer periphery of the first pulley and a belt is set.

FIG. 20 is an explanatory view of a method for using the belt installation tool according to the fourth embodiment of the present invention.

FIG. 21 is a perspective view of a belt installation tool according to a fifth embodiment of the present invention.

FIG. 22 is a view illustrating a state where the belt installation tool according to the fifth embodiment of the present invention is installed on the outer periphery of the first pulley.

FIG. 23 is a perspective view of a belt installation tool according to a sixth embodiment of the present invention.

FIG. 24 is a view illustrating a state where the belt installation tool according to the sixth embodiment of the present invention is installed on the outer periphery of the first pulley.

FIG. 25 is a perspective view of a belt installation tool according to a seventh embodiment of the present invention.

FIG. 26 is a view illustrating a state where the belt installation tool according to the seventh embodiment of the present invention is installed on the outer periphery of the first pulley.

FIG. 27 is a perspective view of a belt installation tool according to an eighth embodiment of the present invention.

FIG. 28 is a view illustrating a state where the belt installation tool according to the eighth embodiment of the present invention is installed on the outer periphery of the first pulley.

MODE FOR CARRYING OUT THE INVENTION (First Embodiment)

Description is given below of a first embodiment of the present invention with reference to the drawings. A belt installation tool according to this embodiment is used to wind a V-ribbed belt between a crank pulley and an alternator pulley of an alternator. With reference to FIG. 1, description is given of how to wind a V-ribbed belt on the crank pulley and alternator pulley and, with reference to FIG. 2, description is given of the structure of the crank pulley.

As illustrated in FIG. 1, on an engine main body 1, a crank pulley 2 (first pulley) to be connected to a crank shaft of an engine, and an alternator pulley 3 (second pulley) to be connected to an input shaft of an alternator are rotatably supported in such a manner that they are spaced a predetermined inter-axial distance from each other. Between the crank pulley 2 and alternator pulley 3, a V-ribbed belt 4 illustrated by solid lines and broken lines is wound, whereby the power of the crank shaft can be transmitted to the input shaft of the alternator, through the crank pulley 2, V-ribbed belt 4 and alternator pulley 3 in this order. In this embodiment, the inter-axial distance between the crank pulley 2 and alternator pulley 3 is unchangeable and, as illustrated in the drawings, a so-called auto tensioner (tension applying device) for applying tension to the V-ribbed belt 4 is not installed.

As illustrated in (a) and (b) of FIG. 2, the crank pulley 2 has a pulley groove 2a fittable with a rib formed on the inner periphery of the V-ribbed belt 4, and a pair of pulley flanges 2b sandwiching the pulley groove 2a therebetween in the pulley axial direction. The pulley flanges 2b, in (b) of FIG. 2 (in a cross-sectional view), are formed to project slightly more outward in the pulley radial direction than the pulley groove 2a. Also, into the boss part 5 of the crank pulley 2, a crank shaft (not illustrated) of the engine is inserted. Reference numeral 2c denotes the side surface of the crank pulley 2. Here, the V-ribbed belt 4 is a so-called low modulus belt which is slightly expendable in the peripheral length direction.

Here, a bold arrow P in FIG. 1 indicates the running direction of the V-ribbed belt 4. The rotation direction of the crank pulley 2 when the V-ribbed belt 4 travels in this running direction is defined as a first rotation direction A, while a direction opposite to the first rotation direction A is defined as a second rotation direction B.

Next, with reference to FIG. 3 to FIG. 6, description is given of the structure of the belt installation tool 6 of this embodiment. (a) to (d) of FIG. 3 are respectively perspective views of the belt installation tool 6 when viewed from different directions. (a) of FIG. 4 is a front view of the belt installation tool 6. (b) of FIG. 4 is a plan view of the belt installation tool 6. (c) of FIG. 4 is a bottom view of the belt installation tool 6. (d) of FIG. 4 is a left side view of the belt installation tool 6. (e) of FIG. 4 is a right side view of the belt installation tool 6. (f) of FIG. 4 is a back view of the belt installation tool 6. Thus, in FIG. 3 and FIG. 4, the compact and well-formed belt installation tool 6 is drawn from various directions.

As illustrated in FIG. 5 to FIG. 6, the belt installation tool 6 of this embodiment includes, as main components, a pulley pressing part 7, a belt hold part 8, a belt pressing part 9, and a protection layer 71. This belt installation tool 6 further includes a first contact part 10 (contact part) and a second contact part 11 (contact part). This belt installation tool 6 is installed on the outer periphery of the crank pulley 2 and used. As illustrated in FIG. 5, when in use, it is oriented in such a manner that the belt hold part 8 is located further in the first rotation direction A than the pulley pressing part 7 and the belt pressing part 9 is located further in the second rotation direction B than the pulley pressing part 7. For convenience of explanation, the following descriptions are given by using the first rotation direction A and second rotation direction B defined in FIG. 1, properly. That is, symbols A and B in FIG. 5 to FIG. 6 respectively correspond to the first rotation direction A and second rotation direction B of the crank pulley 2 illustrated in FIG. 1.

The pulley pressing part 7, belt hold part 8 and belt pressing part 9, as illustrated in FIG. 5, are connected to each other by a connecting part 12 extending in the pulley peripheral direction. The connecting part 12 is formed of a sheet metal in an arc shape which does not overlap with the crank pulley 2 in the pulley radial direction but is adjacent to the crank pulley 2 in the pulley axial direction. A state where the belt is added to the state of FIG. 5 is illustrated in (a) of FIG. 7. (a) of FIG. 7 should also be referred to properly when a description about the V-ribbed belt 4 is given afterwards.

The pulley pressing part 7 is arranged on the outer periphery of the crank pulley 2 (which corresponds to the pulley groove 2a; this applies in the following description as well), and, after the V-ribbed belt 4 is wound thereon, it is pressed against the outer periphery of the crank pulley 2 by the tension of the V-ribbed belt 4. The pulley pressing part 7, as illustrated in (b) of FIG. 6, is formed to include a plate section 7a formed integrally with the connecting part 12 and a friction member 7b disposed on the crank-pulley 2 side of the plate section 7a for enhancing the frictional force between the pulley pressing part 7 and the outer periphery of the crank pulley 2. The friction member 7b is fixed by welding to the plate section 7a, and is formed in an arc shape so as to secure a sufficient contact area with respect to the outer periphery of the crank pulley 2, the inner peripheral surface of which is formed flat and has a width corresponding to the width of the pulley groove 2a (see (b) of FIG. 7 as well). The friction member 7b is preferably formed of, for example, metal material subjected to appropriate surface treatment, rubber, elastomer such as polyurethane, and synthetic resin such as polyethylene or polyamide.

Also, as illustrated in FIG. 3 to FIG. 4, on the inner-peripheral-surface side of the friction member 7b of the pulley pressing part 7, that is, on the crank-pulley 2 side of the friction member 7b, a protection layer 71 is formed so as to cover the whole inner peripheral surface of the friction member 7b. The protection layer 71 has a sheet shape and is bonded to the inner peripheral surface of the friction member 7b by an adhesive tape or the like. The protection layer 71, as illustrated in (b) of FIG. 7, is disposed so as to come into contact with the outer periphery of the crank pulley 2 when the belt installation tool 6 is installed on the outer periphery of the crank pulley 2.

In this embodiment, the protection layer 71 is formed of elastic soft vinyl chloride. Here, a material used for the protection layer 71 may be any material so long as it has elasticity, and examples thereof include resins such as soft vinyl chloride, engineering plastics, various kinds of fibers, papers, and woods (non-elastic metal is not suitable). Also, the thickness of the protection layer 71 is preferably within the range of 1 mm or larger and 3 mm or smaller and uniform as a whole, and particularly preferably 2 mm or less. The reason for this is as follows: that is, in the case where the thickness of the protection layer 71 is smaller than 1 mm, cracks may occur in the protection layer 71 in some cases by repeated use of the belt installation tool 6; and, meanwhile, in the case where the thickness of the protection layer 71 is more than 3 mm, the thickness of the protection layer 71 increases to thereby lower the workability at the time when attaching the protection layer 71 to the pulley pressing part 7.

Also, as for the method for attaching the protection layer 71 to the pulley pressing part 7, this embodiment employs the method for bonding by the adhesive tape. However, it is not limited thereto, and there may also be employed a method of dip coating, fitting a tube-shaped protection layer 71 into the pulley pressing part 7, engaging a preformed protection layer 71 with the pulley pressing part 7 to thereby achieve the attachment, or applying a non-solid (liquid, gel) material (resin, etc.) to the pulley pressing part 7 and drying it to thereby form a protection layer 71.

The belt hold part 8 is used to hook and hold a part 4a (see (a) of FIG. 7) deviated from the outer periphery of the crank pulley 2 among the V-ribbed belt 4 wound on the pulley pressing part 7. The belt hold part 8, as illustrated in FIG. 5, is arranged on the first-rotation-direction A side end portion of the connecting part 12 and is formed integrally with the connecting part 12. The first contact part 10 is formed integrally with the belt hold part 8 in a further first-rotationdirection A side end portion than the belt hold part 8. And, when viewed from the pulley axial direction, the belt hold part 8 and first contact part 10 are curved so as to draw a semicircular arc from the outer periphery of the crank pulley 2 toward the inner periphery thereof, while this curvature provides convex toward the first rotation direction A.

The belt pressing part 9 is arranged opposed to the outer periphery of the crank pulley 2 and is used to press a portion 4*b* (see (a) of FIG. 7) extending along the outer periphery of the crank pulley 2 among the V-ribbed belt 4 wound on the pulley pressing part 7, against the outer periphery of the crank pulley 2. The belt pressing part 9, as illustrated in FIG. 5, is arranged in the second-rotation-direction B side end portion of the connecting part 12 and, as illustrated in (a) of FIG. 6, is formed to include a plate section 9*a* formed integrally with the connecting part 12 and a large-thickness section 9*b* arranged on the crank-pulley 2 side of the plate section 9*a*. The large-thickness section 9*b* is fixed to the plate section 9*a* by welding and has a width corresponding to the pulley width. Also, as illustrated in (a) of FIG. 6, between the belt pressing part 9 (large-thickness section 9*b*) and the outer periphery of the crank pulley 2, a space S corresponding to the thickness of the V-ribbed belt 4 is secured, while the V-ribbed belt 4 is to be inserted into the space S. In this embodiment, as illustrated in (b) of FIG. 6, the space S is adjusted so as to have a thickness slightly smaller than the belt thickness of the V-ribbed belt 4 in a state where the protection layer 71 provided on the friction member 7*b* of the pulley pressing part 7 is tightly attached to the outer periphery of the crank pulley 2. Therefore, when the belt installation tool 6 is in use, the belt pressing part 9 is enabled to press the V-ribbed belt 4 against the outer periphery of the crank pulley 2 strongly. Also, as illustrated in FIG. 5, between the pulley pressing part 7 and belt pressing part 9, a space U is secured. Therefore, as illustrated in FIG. 7, the V-ribbed belt 4 wound outside of the pulley pressing part 7 in the pulley radial direction is enabled to get inside of the belt pressing part 9 in the pulley radial direction. Also, in an end portion of the belt pressing part 9 opposite to connecting part 12, as illustrated in (b) of FIG. 6, the above-mentioned second contact part 11 is formed. The second contact part 11 is formed integrally with the plate section 9*a* of the belt pressing part 9, and has a substantially right angle relation with respect to the plate section 9*a* of the belt pressing part 9 so as to enable a surface contact with the side surface 2*c* of the crank pulley 2.

As described heretofore, in this embodiment, the first contact part 10, belt hold part 8, connecting part 12, plate section 7*a* of the pulley pressing part 7, plate section 9*a* of the belt pressing part 9, and second contact part 11 are integrally formed of a steel plate material by sheet metal working, the friction member 7*b* of the pulley pressing part 7 and the large-thickness section 9*b* of the belt pressing part 9 are then welded thereon, and further the protection layer 71 is attached to the inner-peripheral-surface side of the friction member 7*b*, thereby constituting the belt installation tool 6.

Also, in the above description, the belt hold part 8 and first contact part 10 are handled as separate parts but it should be noted that there is no particular clear boundary line between them.

Also, as illustrated in (a) and (b) of FIG. 6, the first contact part 10 and second contact part 11 sandwich the crank pulley 2 in the pulley axial direction, and the first contact part 10 and second contact part 11 come into contact with the respective side surfaces 2*c* of the crank pulley 2. Accordingly, enhanced positioning of the belt installation tool 6 in the pulley axial direction with respect to the outer periphery of the crank pulley 2 is realized.

Also, as illustrated in (b) of FIG. 6, when the belt installation tool 6 is viewed in the pulley radial direction, a U-like shape which is open in the pulley axial direction and is defined by the pulley pressing part 7, connecting part 12 and belt pressing part 9 is recognized. In the following description, the edge of the connecting part 12 corresponding to the bottom of the U-like shape is given reference numeral 12*a*. As illustrated in FIG. 7, the edge 12*a* is designed to guide the V-ribbed belt 4, which exists at a position deviated in the pulley axial direction from the outer periphery of the crank pulley 2, to the outer periphery of the crank pulley 2. Therefore, the V-ribbed belt 4 can come into contact with the edge 12*a* of the connecting part 12 with high pressure.

<Method for Use>

Next, description is given of a method for using the belt installation tool 6 with reference to FIG. 7 to FIG. 14. First, as illustrated in FIG. 8 and FIG. 9, a cylindrical connecting part 13*a* of a wrench 13 is connected to the boss part 5 of the crank pulley 2, thereby previously setting the crank pulley 2 to be freely rotatable manually.

<Procedure (a)>

Next, as illustrated in FIG. 8 and FIG. 9, the V-ribbed belt 4 is wound on the alternator pulley 3. And, the belt installation tool 6 is installed on the outer periphery of the crank pulley 2 in such a manner that the V-ribbed belt 4, as illustrated in (a) of FIG. 7, passes from outside of the pulley pressing part 7 in the pulley radial direction to inside of the belt pressing part 9 in the pulley radial direction and is hooked on the belt hold part 8. In this case, as illustrated in (b) of FIG. 7, the protection layer 71 provided on the friction member 7*b* of the pulley pressing part 7 has a relation where it comes into contact with the pulley groove 2*a* in the pulley radial direction and is sandwiched by a pair of the pulley flanges 2*b* in the pulley axial direction. This relation where the protection layer 71 provided on the friction member 7*b* of the pulley pressing part 7 is sandwiched by a pair of the pulley flanges 2*b* in the pulley axial direction contributes to the positioning and the prevention of position deviation of the belt installation tool 6 in the pulley axial direction. Here, in this case, when the handle of the wrench 13 is arranged to position on the opposite side to the belt installation tool 6 with respect to the center of the crank pulley 2, the above operation is easily workable.

In the above-mentioned state, the V-ribbed belt 4, as illustrated in FIG. 7, when it reaches the belt pressing part 9 from the belt hold part 8 through the pulley pressing part 7, employs an oblique path which, when viewed from the pulley radial direction, is not parallel to the outer periphery of the crank pulley 2. Also, as illustrated in FIG. 9, the V-ribbed belt 4 comes into contact with the side surface 2*c* of the crank pulley 2 in the two locations which are indicated by reference sign p.

<Procedure (b)>

Next, as illustrated in FIG. 10, by using the wrench 13, the crank pulley 2 is rotated in the first rotation direction A so as to increase the winding angle θ with which the V-ribbed belt 4 is wound direct on the outer periphery of the crank pulley 2.

Then, the V-ribbed belt 4, as illustrated in (a) of FIG. 7, is stretched to thereby generate high tension T. Since the V-ribbed belt 4 passes through the outside of the pulley pressing part 7 in the pulley radial direction as illustrated, the tension T, as indicated by an outline arrow in (b) of FIG. 7, acts as a pressing action to press the pulley pressing part 7 against the outer periphery of the crank pulley 2 strongly. In this case, since the elastic protection layer 71 comes into direct contact with the outer periphery of the crank pulley 2, damage to the outer periphery of the crank pulley 2 and damage to the pulley pressing part 7 can be prevented. Also, the protection layer 71 exhibits a function of suppressing the sliding (positional deviation) of the belt installation tool 6 relative to the crank pulley 2.

When the crank pulley 2 is continuously rotated in the same direction, the above-mentioned contact relation between the V-ribbed belt 4 and the side surface 2c of the crank pulley 2 is forcibly removed by the belt hold part 8 and, as indicated by broken and solid lines in FIG. 11, the V-ribbed belt 4 hooked and held by the belt hold part 8 leaves the belt hold part 8 by its own tension and moves onto the outer periphery of the crank pulley 2 spontaneously.

When the crank pulley 2 is further rotated in the same direction, as illustrated in FIG. 12 and FIG. 13, the relation that the pulley pressing part 7 is sandwiched by the V-ribbed belt 4 and the outer periphery of the crank pulley 2 disappears, whereby, for example, as illustrated in FIG. 13, the belt installation tool 6 is enabled to leave the outer periphery of the crank pulley 2. When the crank pulley 2 is further rotated in the same direction, the belt installation tool 6, as illustrated in FIG. 14, is discharged from the crank pulley 2 toward the alternator pulley 3 in a state of hanging down from the V-ribbed belt 4. The belt installation tool 6 may be collected at this time.

(Effects)

According to the above-described structure, the pulley pressing part 7 exhibits a function of fixing the belt installation tool 6 strongly to the outer periphery of the crank pulley 2 by using the high tension of the V-ribbed belt 4. Also, since the V-ribbed belt 4 is situated on the outside of the pulley pressing part 7 in the pulley radial direction without any problem due to existence of the belt hold part 8 and belt pressing part 9, the belt hold part 8 and belt pressing part 9 play a role of stably exhibiting the function of fixing the belt installation tool 6 strongly to the outer periphery of the crank pulley 2.

Also, the elastic protection layer 71 is arranged on the pulley pressing part 7 in the side of the outer periphery of the crank pulley 2 so as to come into contact with the outer periphery of the crank pulley 2 when the belt installation tool 6 is installed on the outer periphery of the crank pulley 2. Thus, when the V-ribbed belt 4 is wound on the pulley pressing part 7 and the pulley pressing part 7 is pressed toward the side of the outer periphery of the crank pulley 2, the elastic protection layer 71 comes into direct contact with the outer periphery of the crank pulley 2, thereby enabling prevention of damage to the outer periphery of the crank pulley 2 and damage to the pulley pressing part 7. Also, the protection layer 71 exhibits a function of suppressing the sliding (positional deviation) of the belt installation tool 6 relative to the crank pulley 2.

Also, according to the above-described structure, the protection layer 71 is formed of a resin, thereby providing excellent versatility. Furthermore, the protection layer 71 is formed of soft vinyl chloride, thereby providing excellent manufacturing cost and workability.

Furthermore, according to the above-described structure, since the thickness of the protection layer 71 is set to 1 mm or larger and 3 mm or smaller, the strength of the protection layer 71 can be enhanced without lowering the workability at the time when attaching the protection layer 71 to the pulley pressing part 7.

(Second Embodiment)

Next, description is given of a second embodiment of the present invention with reference to FIG. 15. Description is given below mainly of the different points of this embodiment from the first embodiment and thus the duplicate description thereof is omitted properly.

In the first embodiment, on the crank-pulley 2 side of the plate section 7a, the friction member 7b and protection layer 71 respectively having a flat inner peripheral surface are provided. However, instead of the friction member 7b and protection layer 71, a fitting protrusion 7c (protection layer) fittable into the pulley groove 2a of the crank pulley 2 may be provided. Here, the fitting protrusion 7c plays a similar role to the above-mentioned protection layer 71 and, in this embodiment, the fitting protrusion 7c is formed of elastic soft vinyl chloride. The material used for the fitting protrusion 7c may be any material so long as it has elasticity. For example, use can be made of resins such as soft vinyl chloride, engineering plastics, various kinds of fibers, papers, and woods.

As described above, the pulley pressing part 7 includes, on the crank-pulley 2 side thereof, the fitting protrusion 7c (protection layer) to be fitted into the pulley groove 2a formed in the outer periphery of the crank pulley 2. This structure can suppress the position deviation of the belt installation tool 6 with respect to the crank pulley 2 at a high level. Particularly, the position deviation of the belt installation tool 6 relative to the crank pulley 2 in the pulley axial direction can be suppressed at a very high level.

(Third Embodiment)

Next, description is given of a third embodiment of the present invention with reference to FIG. 16A and FIG. 16B. The following description is given mainly of the different points of this embodiment from the first embodiment and the duplicate description is omitted properly.

That is, in the first embodiment, on the crank-pulley 2 side of the plate section 7a, the friction member 7b and protection layer 71 are provided. However, instead of this, as illustrated in FIG. 16A and FIG. 16B, a flat plate-shaped flange contact part 7d (corresponding to the protection layer 71) contactable with the pulley flange 2b in the pulley axial direction may be provided. This flange contact part 7d is fixed by welding to the plate section 7a. Although the flange contact part 7d is made of wood in this embodiment, the material thereof used may be any one so long as it has elasticity, and for example, use can be made of resins such as soft vinyl chloride and engineering plastics. The thickness of the flange contact part 7d is equal to a protrusion height h of the pulley flange 2b from the pulley groove 2a and, therefore, the flange contact part 7d can be just stored into a space defined by the pulley groove 2a and a pair of pulley flanges 2b and can contact with the pulley groove 2a and pulley flanges 2b. This structure can suppress the position deviation of the belt installation tool 6 relative to the crank pulley 2 in the pulley axial direction at a high level.

(Fourth Embodiment)

Next, description is given of the structure of a belt installation tool 206 according to a fourth embodiment of the present invention with reference to FIG. 17 to FIG. 20. Here, the description of similar parts to the first embodiment is omitted. (a) to (d) of FIG. 17 are respectively perspective views of the belt installation tool 206 when viewed from different directions. FIG. 18 is a view illustrating a state where the belt installation tool 206 is installed on the outer periphery of the crank pulley 2. FIG. 19 is a view illustrating a state where the belt installation tool 206 is installed on the outer periphery of the crank pulley 2 and the V-ribbed belt 4 is set. FIG. 20 is an explanatory view of how to use the belt installation tool 206.

As illustrated in FIG. 17 to FIG. 18, the belt installation tool 206 of this embodiment includes, as main components, a pulley pressing part 207, a belt hold part 208, a belt pressing part 209, and a protection layer 271. The belt installation tool 206 further includes a third contact part 210 (contact part) and a fourth contact part 211 (contact part).

The protection layer 271 of this embodiment is made of a resin (soft vinyl chloride), has a tube shape having a hollow inside, and is fitted into the pulley pressing part 207 to thereby cover the whole of the pulley pressing part 207. Here, the inside shape of the protection layer 271 is preferably formed slightly smaller than the pulley pressing part 207. In this case, when the stretchable protection layer 271 is fitted into the pulley pressing part 207 due to the elasticity thereof, the adhesion of the protection layer 271 to the pulley pressing part 207 is enhanced, whereby, when using the belt installation tool 206, the protection layer 271 can be prevented from removal from the pulley pressing part 207.

This belt installation tool 206 is installed on the outer periphery of the crank pulley 2 and used. When in use, as illustrated in FIG. 18, it is oriented in such a manner that the belt hold part 208 is located further in the first rotation direction A than the pulley pressing part 207 and the belt pressing part 209 is located further in the second rotation direction B than the pulley pressing part 207. The following descriptions are given, similarly to the first embodiment, by using properly the first rotation direction A and second rotation direction B respectively defined in FIG. 1.

The pulley pressing part 207, belt hold part 208 and belt pressing part 209, as illustrated in FIG. 17 to FIG. 18, are connected to each other by a connecting part 212 extending in the pulley peripheral direction. This connecting part 212 is formed of a sheet metal in an arc shape which does not overlap with the crank pulley 2 in the pulley radial direction but is adjacent to the crank pulley 2 in the pulley axial direction. A state where the belt is added to the state of FIG. 18 is illustrated in FIG. 19. FIG. 19 should also be referred to properly when a description about the V-ribbed belt 4 is given afterwards.

The pulley pressing part 207 with the protection layer 271 fitted therein is arranged on the outer periphery of the crank pulley 2 (corresponding to the pulley groove 2a; this applies in the following description as well), and after the V-ribbed belt 4 is wound thereon, it is pressed against the outer periphery of the crank pulley 2 by the tension of the V-ribbed belt 4. This pulley pressing part 207 is formed integrally with the connecting part 212. Here, the following description is given on the assumption that the tube-shaped protection layer 271 has been fitted into the pulley pressing part 207.

The belt hold part 208 is used to hook and hold a part 4a (see FIG. 19) deviated from the outer periphery of the crank pulley 2 among the V-ribbed belt 4 wound on the pulley pressing part 207. The belt hold part 208 is arranged on the first-rotation-direction A side end portion of the connecting part 212 and is formed integrally with the connecting part 212. The third contact part 210 is formed integrally with the belt hold part 208 in a further first-rotation-direction A side end portion than the belt hold part 208. And, when viewed from the pulley axial direction, the belt hold part 208 and third contact part 210 have a shape bent inwardly of the crank pulley 2 with respect to the connecting part 212. Also, the side surface 210a of the third contact part 210 is surface contacted with the side surface 2c of the crank pulley 2.

The belt pressing part 209 is arranged opposed to the outer periphery of the crank pulley 2 and is used to press a portion 4b (see FIG. 19) extending along the outer periphery of the crank pulley 2 among the V-ribbed belt 4 wound on the pulley pressing part 207, against the outer periphery of the crank pulley 2. The belt pressing part 209, as illustrated in FIG. 18, is arranged on the second-rotation-direction B side of the connecting part 212 and is formed integrally with the connecting part 212. Also, between the belt pressing part 209 and the outer periphery of the crank pulley 2, a space S corresponding to the thickness of the V-ribbed belt 4 is secured, while the V-ribbed belt 4 is to be inserted into this space S. Also, as illustrated in FIG. 18, between the pulley pressing part 207 and belt pressing part 209, a space U is secured. Thus, as illustrated in FIG. 19, the V-ribbed belt 4 wound outside of the pulley pressing part 207 in the pulley radial direction is enabled to get inside of the belt pressing part 209 in the pulley radial direction.

Also, the fourth contact part 211 is arranged in the second-rotation-direction B side end portion of the connecting part 212 and is formed integrally with the connecting part 212. And, when viewed from the pulley axial direction, the fourth contact part 211 has a shape bent inwardly of the crank pulley 2 with respect to the connecting part 212. Also, the side surface 211a of the fourth contact part 211 is surface contacted with the side surface 2c of the crank pulley 2. Here, the fourth contact part 211 has a hole 230 formed near the center thereof. A string 231 can be inserted through this hole 230. When the string 231 inserted through the hole 230 is connected to the wrench 13, the belt installation tool 6 can be prevented from dropping down from the wrench 13.

<Method for Use>

Next, description is given of a method for using the belt installation tool 206 with reference to FIG. 19 to FIG. 20. First, as illustrated in FIG. 20, the cylindrical connecting part 13a of the wrench 13 is connected to the boss part 5 of the crank pulley 2, thereby previously setting the crank pulley 2 to be freely rotatable manually.

Next, as illustrated in FIG. 19 and FIG. 20, the V-ribbed belt 4 is wound on the alternator pulley 3, and, the belt installation tool 206 is installed on the outer periphery of the crank pulley 2 in such a manner that the V-ribbed belt 4, as illustrated in FIG. 19, passes from outside of the pulley pressing part 207 in the pulley radial direction to inside of the belt pressing part 209 in the pulley radial direction, and is hooked on the belt hold part 208.

In the above-mentioned state, the V-ribbed belt 4, as illustrated in FIG. 19, when it reaches the belt pressing part 209 from the belt hold part 208 through the pulley pressing part 207, employs an oblique path which, when viewed from the pulley radial direction, is not parallel to the outer periphery of the crank pulley 2. Here, the pulley pressing part 207 is strongly pressed against the outer periphery of the crank pulley 2. At this time, since the elastic protection layer 271 comes into direct contact with the outer periphery of the crank pulley 2, damage to the outer periphery of the crank pulley 2 and damage to the pulley pressing part 207 can be prevented. Also, the protection layer 271 exhibits a function of suppressing the sliding (positional deviation) of the belt installation tool 206 relative to the crank pulley 2. The procedure after this is similar to the first embodiment and thus the description thereof is omitted.

As described above, in the fourth embodiment, the third contact part 210, belt hold part 208, connecting part 212, pulley pressing part 207, belt pressing part 209, and fourth contact part 211 are integrally formed of a steel plate material by sheet metal working, thereby constituting the belt installation tool 206.

Also, in the above description, the belt hold part 208 and third contact part 210 are handled as separate parts but it should be noted that there is no particular clear boundary line between them.

(Effects)

According to the above-described structure, the whole of the pulley pressing part 207 can be covered by the tube-shaped protection layer 271. Thus, the whole of the pulley pressing part 207 can be protected. Also, the workability when installing the protection layer 271 onto the pulley pressing part 207 can be enhanced.

(Fifth Embodiment)

Next, description is given of the structure of a belt installation tool 306 according to a fifth embodiment of the present invention with reference to FIG. 21 to FIG. 22. Here, while the description of similar parts to the fourth embodiment is omitted, the following description is given mainly of different parts. (a) to (d) of FIG. 21 are respectively perspective views of the belt installation tool 306 when viewed from different directions. FIG. 22 is a view illustrating a state where the belt installation tool 306 is installed on the outer periphery of the crank pulley 2.

As illustrated in FIG. 21 to FIG. 22, this belt installation tool 306, similarly to the fourth embodiment, includes, as main components, a pulley pressing part 307, a belt hold part 308, a belt pressing part 309, and a protection layer 371. The pulley pressing part 307, belt hold part 308 and belt pressing part 309, as illustrated in FIG. 22, are connected to each other by a connecting part 312 extending in the pulley peripheral direction. The belt installation tool 306 further includes a third contact part 310 (contact part) and a fourth contact part 311 (contact part). Here, the fourth contact part 311 has a hole 330 formed near to the center thereof.

And, unlike the fourth embodiment, as illustrated in FIG. 21 and FIG. 22, a sixth contact part 316 is formed on an end portion of the belt pressing part 309 opposite to the connecting part 312. This sixth contact part 316 is formed integrally with the belt pressing part 309 and has a substantially right angle relation with respect to the belt pressing part 309 so as to enable a surface contact with the side surface 2c of the crank pulley 2.

As described above, the fifth embodiment, as illustrated in FIG. 21 and FIG. 22, is characterized in that the sixth contact part 316 is formed in the belt pressing part 309. The sixth contact part 316, third contact part 310 and fourth contact part 311 sandwich the crank pulley 2 in the pulley axial direction, and the sixth contact part 316, third contact part 310 and fourth contact part 311 come into contact with the respective side surfaces 2c of the crank pulley 2. Accordingly, enhanced positioning of the belt installation tool 306 with respect to the outer periphery of the crank pulley 2 in the pulley axial direction is realized.

(Sixth Embodiment)

Next, description is given of the structure of a belt installation tool 406 according to a sixth embodiment of the present invention with reference to FIG. 23 to FIG. 24. Here, while the description of similar parts to the fourth embodiment is omitted, the following description is given mainly of different parts. (a) to (d) of FIG. 23 are respectively perspective views of the belt installation tool 406 when viewed from different directions. FIG. 24 is a view illustrating a state where the belt installation tool 406 is installed on the outer periphery of the crank pulley 2.

As illustrated in FIG. 23 to FIG. 24, this belt installation tool 406, similarly to the fourth embodiment, includes, as main components, a pulley pressing part 407, a belt hold part 408, a belt pressing part 409, and a protection layer 471. The pulley pressing part 407, belt hold part 408 and belt pressing part 409, as illustrated in FIG. 24, are connected to each other by a connecting part 412 extending in the pulley peripheral direction. The belt installation tool 406 further includes a third contact part 410 (contact part) and a fourth contact part 411 (contact part). Here, the fourth contact part 411 has a hole 430 formed near to the center thereof.

And, unlike the fourth embodiment, the pulley pressing part 407, as illustrated in FIG. 23, has a shape bent toward the crank-pulley 2 side along two folding lines 407a and 407b so as to come into contact with the outer periphery of the crank pulley 2. That is, the inner peripheral surface 407c of the pulley pressing part 407 is in a state of approaching the outer periphery of the crank pulley 2 by an amount equivalent to a protrusion height of the pulley flange 2b from the pulley groove 2a. Here, the tube-shaped protection layer 471 is fitted into the pulley pressing part 407 so as to cover the inner peripheral surface 407c. And, in order to enhance a frictional force between the inner peripheral surface 407c of the pulley pressing part 407 covered by the protection layer 471 and the outer periphery of the crank pulley 2, the pulley pressing part 407 is formed to have an arc shape so as to secure a sufficient contact area with respect to the outer periphery of the crank pulley 2, the inner peripheral surface 407c of which is formed flat and has a width corresponding to the width of the pulley groove 2a.

Also, the belt pressing part 409, as illustrated in FIG. 23, has a shape bent toward the crank-pulley 2 side along two folding lines 409a and 409b. Also, between the inner peripheral surface 409c of the belt pressing part 409 and the outer periphery of the crank pulley 2, a space S corresponding to the thickness of the V-ribbed belt 4 is secured, while the V-ribbed belt 4 is to be inserted into this space S. Here, the inner peripheral surface 409c of the belt pressing part 409 is set in a state of approaching the outer periphery of the crank pulley 2 by a distance obtained by subtracting the space S from a protrusion height of the pulley flange 2b from the pulley groove 2a.

As described above, the sixth embodiment is characterized in that, as illustrated in FIG. 23 and FIG. 24, the pulley pressing part 407 and belt pressing part 409 have shapes bent toward the crank-pulley 2 side along the two folding lines 407a and 407b (folding lines 409a and 409b). According to this structure, even in the case where, as illustrated in FIG. 2, there is a difference in level between the pulley groove 2a and pulley flange 2b of the crank pulley 2, since the two folding lines 407a and 407b of the pulley pressing part 407 are bent by an amount equivalent to a protrusion height of the pulley flange 2b from the pulley groove 2a, the inner-peripheral-surface 407c side of the pulley pressing part 407 covered by the protection layer 471 can be brought into contact with the outer periphery of the crank pulley 2. That is, since the pulley pressing part 407 covered by the protection layer 471 and the outer periphery of the crank pulley 2 are contacted with each other, the belt installation tool 406 can be stably installed on the crank pulley 2. Also, similarly, since the two folding lines 409a and 409b of the belt pressing part 409 are bent, the inner peripheral surface 409c of the belt pressing part 409 can be brought into contact with the V-ribbed belt 4b. That is, since the belt pressing part 409 is contacted with the V-ribbed belt 4b arranged along the outer periphery of the crank pulley 2, the belt installation tool 406 can be stably installed on the crank pulley 2.

(Seventh Embodiment)

Next, description is given of the structure of a belt installation tool 506 according to a seventh embodiment with reference to FIG. 25 to FIG. 26. Here, while the description of similar parts to the sixth embodiment is omitted, the following description is given mainly of different parts. (a) to (d) of FIG. 25 are respectively perspective views of the belt installation tool 506 when viewed from different directions. FIG. 26 is a view illustrating a state where the belt installation tool 506 is installed on the outer periphery of the crank pulley 2.

As illustrated in FIG. 25 to FIG. 26, this belt installation tool 506, similarly to the sixth embodiment, includes, as main components, a pulley pressing part 507, a belt hold part 508, a belt pressing part 509, and a protection layer 571. The pulley pressing part 507, belt hold part 508 and belt pressing part 509, as illustrated in FIG. 25, are connected to each other by a connecting part 512 extending in the pulley peripheral direction. The belt installation tool 506 further includes a third contact part 510 (contact part) and a fourth contact part 511 (contact part). Here, the fourth contact part 511 has a hole 530 formed near to the center thereof. Also, the pulley pressing part 507, as illustrated in FIG. 25, has a shape bent toward the crank-pulley 2 side along two folding lines 507a and 507b so as to come into contact with the outer periphery of the crank pulley 2. Also, the belt pressing part 509, as illustrated in FIG. 25, has a shape bent toward the crank-pulley 2 side along two folding lines 509a and 509b.

And, unlike the sixth embodiment, as illustrated in FIG. 25 and FIG. 26, a fifth contact part 515 is formed in an end portion of the pulley pressing part 507 opposite to the connecting part 512. This fifth contact part 515 is formed integrally with the pulley pressing part 507 and has a substantially right angle relation with respect to the pulley pressing part 507 so as to enable a surface contact with the side surface 2c of the crank pulley 2. In this embodiment, the tube-shaped protection layer 571 is fitted so as to cover only the pulley pressing part 507 (here, the tube-shaped protection layer 571 may also be fitted so as to cover the pulley pressing part 507 and fifth contact part 515 integrally). Also, in the end portion of the belt pressing part 509 opposite to the connecting part 512, as illustrated in FIG. 25 to FIG. 26, a sixth contact part 516 is formed. This sixth contact part 516 is formed integrally with the belt pressing part 509 and has a substantially right angle relation with respect to the belt pressing part 509 so as to enable a surface contact with the side surface 2c of the crank pulley 2.

As described above, the seventh embodiment, as illustrated in FIG. 25 and FIG. 26, is characterized in that the pulley pressing part 507 and belt pressing part 509 include the fifth contact part 515 and sixth contact part 516 formed thereon, respectively. The fifth contact part 515, sixth contact part 516, third contact part 510, and fourth contact part 511 sandwich the crank pulley 2 in the pulley axial direction, and the fifth contact part 515, sixth contact part 516, third contact part 510, and fourth contact part 511 come into contact with the respective side surfaces 2c of the crank pulley 2. Accordingly, enhanced positioning of the belt installation tool 506 with respect to the outer periphery of the crank pulley 2 in the pulley axial direction is realized.

(Eighth Embodiment)

Next, description is given of the structure of a belt installation tool 606 according to an eighth embodiment with reference to FIG. 27 to FIG. 28. Here, while the description of similar parts to the fourth embodiment is omitted, the following description is given mainly of different parts. (a) to (d) of FIG. 27 are respectively perspective views of the belt installation tool 606 when viewed from different directions. FIG. 28 is a view illustrating a state where the belt installation tool 606 is installed on the outer periphery of the crank pulley 2.

As illustrated in FIG. 27 to FIG. 28, this belt installation tool 606, similarly to the fourth embodiment, includes, as main components, a pulley pressing part 607, a belt hold part 608, a belt pressing part 609, and a protection layer 671. The pulley pressing part 607, belt hold part 608, and belt pressing part 609, as illustrated in FIG. 27, are connected to each other by a connecting part 612 extending in the pulley peripheral direction.

And, unlike the fourth embodiment, this belt installation tool 606 includes only the third contact part 610 (contact part) (i.e., it does not include a fourth contact part). Also, unlike the fourth embodiment, as illustrated in FIG. 27 to FIG. 28, a sixth contact part 616 is formed in an end portion of the belt pressing part 609 opposite to the connecting part 612. The sixth contact part 616 is formed integrally with the belt pressing part 609 and has a substantially right angle relation with respect to the belt pressing part 609 so as to enable a surface contact with the side surface 2c of the crank pulley 2.

As described above, the eighth embodiment, as illustrated in FIG. 27 and FIG. 28, is characterized by including the third contact part 610 and sixth contact part 616 as a paired contact parts to come into contact with the respective side surfaces 2c of the crank pulley 2. The third contact part 610 and sixth contact part 616 sandwich the crank pulley 2 in the pulley axial direction, and the third contact part 610 and sixth contact part 616 come into contact with the respective side surfaces 2c of the crank pulley 2. Accordingly, enhanced positioning of the belt installation tool 606 with respect to the outer periphery of the crank pulley 2 in the pulley axial direction is realized.

Although descriptions have been given heretofore of the embodiments of the present invention, the present invention is not limited to the above-described embodiments and can be enforced while it is changed variously without departing from the scope of the patent claims thereof.

For example, in the fourth to eighth embodiments, the tube-shaped protection layers 271, 371, 471, 571, and 671 are described with reference to the structures for fitting them into their respective pulley pressing parts. However, it is not limited thereto and, as for the method for attaching the protection layer to the pulley pressing part, a sheet-shaped protection layer may be attached to the inner peripheral surface of the pulley pressing part (the side of the outer periphery of the crank pulley 2) with an adhesive tape similarly to the first embodiment, a protection layer may be formed on the pulley pressing part by dip coating, a preformed protection layer may be attached on the pulley pressing part through engagement between them, and a protection layer may be formed by applying non-solid (liquid, gel) material (resin, etc.) to the pulley pressing part and drying it.

This application is based on Japanese patent application No. 2015-015147 filed on Jan. 29, 2015 and Japanese patent application No. 2016-004098 filed on Jan. 13, 2016, and the contents thereof are incorporated herein by references.

DESCRIPTION OF REFERENCE NUMERALS AND SIGNS

2 Crank pulley
3 Alternator pulley
4 V-ribbed belt

6 Belt installation tool
7 Pulley pressing part
8 Belt hold part
9 Belt pressing part
71 Protection layer

The invention claimed is:

1. A belt installation tool to be installed on an outer periphery of a first pulley for use in winding a belt stretchable in a peripheral direction between the first pulley and a second pulley with an inter-axial distance between the first pulley and the second pulley remaining fixed, wherein the belt installation tool comprises:

a pulley pressing part arranged on the outer periphery of the first pulley and, when the belt is wound thereon, capable of being pressed toward the outer periphery of the first pulley by a tension of the belt;

a protection layer having elasticity;

a belt hold part for hooking and holding a first part of the belt wound on the pulley pressing part, the first part being deviated from the outer periphery of the first pulley; and a belt pressing part arranged opposed to the outer periphery of the first pulley for pressing a second part of the belt wound on the pulley pressing part against the outer periphery of the first pulley, the second part extending along the outer periphery of the first pulley, wherein the pulley pressing part comprises a plate section and a friction member disposed on a first-pulley side of the plate section, and wherein the protection layer is arranged on the friction member on a side of the outer periphery of the first pulley so as to come into contact with the outer periphery of the first pulley when the belt installation tool is installed on the outer periphery of the first pulley.

2. The belt installation tool according to claim 1,
wherein the protection layer is formed of a resin.

3. The belt installation tool according to claim 2,
wherein the resin forming the protection layer comprises a soft polyvinyl chloride.

4. The belt installation tool according to claim 1,
wherein the protection layer has a hollow tube shape and is fitted onto the pulley pressing part.

5. The belt installation tool according to claim 1,
wherein the protection layer has a thickness of 1 mm or larger and 3 mm or smaller.

* * * * *